United States Patent [19]
Wakabayashi et al.

[11] Patent Number: 5,614,972
[45] Date of Patent: Mar. 25, 1997

[54] CAMERA WITH MOVABLE LENS AND METHOD OF OPERATION

[75] Inventors: Hiroshi Wakabayashi, Yokohama; Hidenori Miyamoto, Chiba-ken; Toshiyuki Nakamura, Tokyo, all of Japan

[73] Assignee: Nikon Corporation, Tokyo, Japan

[21] Appl. No.: 272,428

[22] Filed: Jul. 11, 1994

[30] Foreign Application Priority Data

| Jul. 9, 1993 | [JP] | Japan | 5-194079 |
| Aug. 4, 1993 | [JP] | Japan | 5-212288 |
| Aug. 4, 1993 | [JP] | Japan | 5-212289 |
| Jan. 27, 1994 | [JP] | Japan | 6-007828 |

[51] Int. Cl.⁶ .............................. G03B 1/18; G03B 17/04
[52] U.S. Cl. .............................. 396/135; 396/86; 396/349
[58] Field of Search ........................... 354/195.1, 195.11, 354/195.12, 400, 187

[56] References Cited

U.S. PATENT DOCUMENTS

| Re. 31,219 | 4/1983 | Shenk | 354/195.1 |
| Re. 33,016 | 8/1989 | Ishikawa et al. | 354/400 |
| 4,160,590 | 7/1979 | Reynard | 354/195 |
| 4,199,244 | 4/1980 | Shenk | 354/195.1 |
| 4,200,378 | 4/1980 | Shenk | 354/195.1 |
| 4,294,531 | 10/1981 | Shenk | 354/195.1 |
| 4,348,089 | 9/1982 | Shenk | 354/195.1 |
| 4,477,167 | 10/1984 | Ishikawa et al. | 354/400 |
| 4,984,000 | 1/1991 | Watanabe et al. | 354/195.1 |
| 5,367,354 | 11/1994 | Kawasaki et al. | 354/400 |

FOREIGN PATENT DOCUMENTS 61-55099 11/1986 Japan .

Primary Examiner—Safet Metjahic
Assistant Examiner—Nicholas J. Tuccillo
Attorney, Agent, or Firm—Oliff & Berridge

[57] ABSTRACT

A camera is equipped with a photographic lens and a drive for moving the lens relative to the camera body. If an external or other force prevents the lens from moving to a prescribed position within a set time interval, for example, the drive changes the drive speed of the lens from a first-drive speed to a slower, second drive speed. When the external or other force is removed and normal movement of the lens again is possible, the drive changes the drive speed of the lens from the slower, second drive speed to the first drive speed, without requiring complicated restorative action on the part of the operator. Thus, damage to the drive and other components of the camera is prevented, without complicating operation of the camera.

52 Claims, 28 Drawing Sheets

CAMERA WITH MOVABLE LENS AND METHOD OF OPERATION

BACKGROUND OF THE INVENTION

1. Field of the Invention

The present invention relates to a camera, and more particularly, to a camera in which a photograph is taken after drive control of a photographic lens is performed in accordance with results of distance measurement, and to a camera that regulates movement of the photographic lens along the optic axis.

2. Description of Related Art

With a camera in which a photograph is taken after drive control of the photographic lens is performed, a system has been proposed that detects when the lens barrel is stopped by an external force while the lens barrel is being driven. The stoppage of movement is detected and the supply of electric current to the motor is cut, thereby preventing damage to the drive circuit and to the lens barrel drive mechanism.

With conventional cameras there exists the problem that when an abnormal condition is detected, the lens barrel is stopped and remains stopped. Even after the external or similar force that caused the abnormal condition is removed, it is impossible to continue using the camera until the photographer performs some kind of restoration action.

With conventional types of auto-focus cameras, the current to the lens drive is terminated and the drive sequence is stopped when the lens does not attain a set position within a prescribed time interval. With conventional cameras in which the lens mirror tube, that is, the lens barrel, protrudes from the camera cover and performs focussing and zooming, the lens barrel driving action completely stops if the photographer carelessly touches the lens mirror tube, causing it not to attain a set position within a prescribed time. In this state, photography is not possible, and, in addition, the camera cannot be restored without a complicated operation. Also, if electric current continues to flow and the driving action is not stopped, abnormally high temperatures may be generated in the drive motor, damaging it.

Japanese Patent Publication No. 61-55099 discloses a single focus camera that includes a shutter action control that exposes the proper amount of light to the film, a distance measurement device that measures the distance from the camera to the object being photographed, and a lens barrel drive control that uses a signal from the distance measurement device and drives the lens to the proper position. After the camera measures the distance, if the photographer's hand or another object accidentally touches the lens barrel and prevents it from moving to the target position, the lens barrel drive control detects that the driving action cannot be completed within a prescribed time interval. The lens barrel drive control then terminates the current to the drive motor and stops driving the lens barrel. Even if the lens barrel is not driven, however, the shutter action control still is operable. Thus, a photograph can be taken even if it is out of focus.

On conventional cameras equipped with a zoom lens, to vary the magnification the photographer operates a driving switch on the exterior of the camera body. The lens barrel then is thrust out or retracted by electromotive force. Such cameras equipped with a variable magnification optical system differ from single focus cameras, in that no countermeasures are performed in the event the lens barrel is unable to move to its target position.

In such cameras, therefore, problems can arise if the lens barrel is accidentally touched by the photographer or has an external force applied to it from some other source. When photography is performed through a closed window, for example, the lens barrel may hit the window when the photographer varies the magnification. If the driving switch is left on, the drive motor may overheat or the shutter may not switch off, and photography will not be able to proceed.

SUMMARY OF THE INVENTION

To overcome the above and other problems, it is an object of embodiments of the invention to prevent damage to a lens drive of the camera by cutting the normal supply of electric current to the drive when an external force on the lens barrel creates an abnormal condition. Normal movement of the lens barrel can be resumed, without complicated restorative action, when the external force causing the abnormal condition is removed.

When a detector according to embodiments of the invention detects that the lens is not moving, or has not reached a prescribed position within a predetermined time interval, the lens drive reduces the speed at which the lens is moved. A drop in driving force results, making it possible Co continue driving the lens without damaging the drive circuit or the drive mechanism. Additionally, because the detector continues to operate after the speed reduction, it is possible to resume normal movement of the lens without complicated restorative action by the operator.

BRIEF DESCRIPTION OF THE DRAWINGS

The invention will be described in detail with reference to the following drawings in which like reference numerals refer Co like elements and wherein.

DETAILED DESCRIPTION OF PREFERRED EMBODIMENTS

Figure 1:
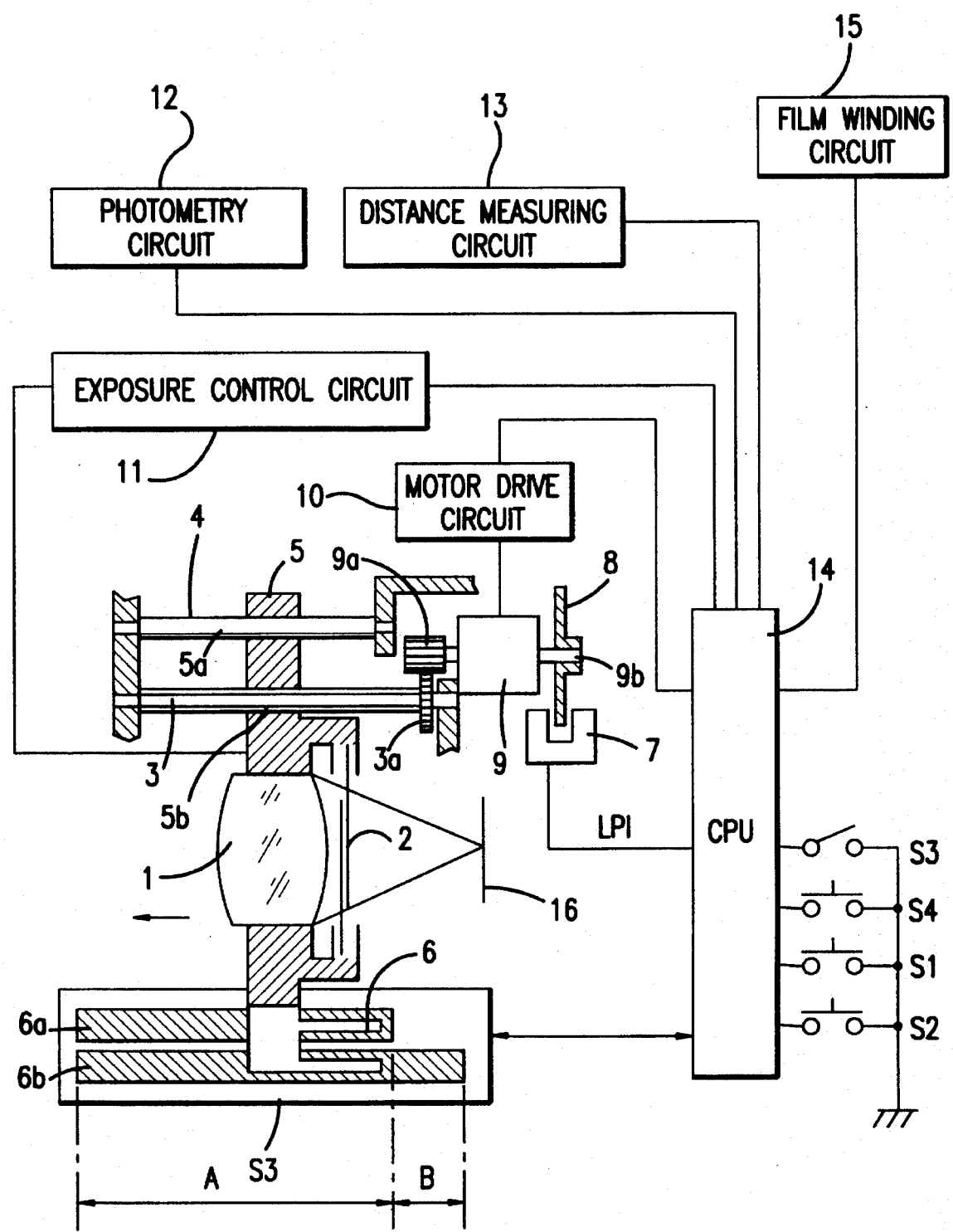
FIG. 1 is a block diagram of a camera according to an embodiment of the present invention.

FIG. 1 is a block diagram showing a camera according to an embodiment of the present invention.

In FIG. 1, photographic lens 1 includes a single focus lens, or a variable magnification lens possessing multiple lens groups, and is maintained by lens frame 5. On the top part of frame 5, guide hole 5a and female screw hole 5b are provided. Guide hole 5a guides the movement of lens frame 5 in the direction of the optic axis (the left-right direction in FIG. 1) by moving along rod 4, and female screw hole 5b fits with screw 3 to drive lens frame 5 in the direction of the optic axis. Shutter diaphragm 2 is provided on the side of lens frame 5 toward photographic film 16, and rubbing brush 6 is solidly attached to the bottom edge of lens frame 5. Thus, lens frame 5, shutter diaphragm 2, and rubbing brush 6 all move as a single entity in the direction of the optic axis.

On the right end of screw 3 is fixed gear 3a, which has the same axis as screw 3. Gear 3a fits together with pinion gear 9a, pinion gear 9a being fixed to rotation axle 9b of focussing motor drive 9. Accordingly, screw 3 is rotated by rotation of focussing motor 9, causing movement of lens frame 5 in the direction of the optic axis. Movement of lens frame 5 is controlled by CPU circuit 14 through motor drive circuit 10. In addition, the amount of movement of lens frame 5 is detected by the combination of photo-interrupter 7 and rotation plate 8 attached to rotation axle 9b, and is supplied to CPU circuit 14 in the form of a pulse signal output from photo-interrupter 7.

Rubbing brush 6, attached to the bottom edge of lens frame 5, along with conductor patterns 6a and 6b, form lens barrel switch S3. In other words, conductor pattern 6a forms a movable component of lens barrel switch S3, and conductor pattern- 6b forms a fixed component of lens barrel switch S3. Because there is a difference in length between conductor patterns 6a and 6b, conductor pattern 6b is divided into a region A, in which conductor patterns 6a and 6b overlap in FIG. 1, and a region B, in which conductor patterns 6a and 6b do not overlap in FIG. 1.

Lens barrel switch S3 is ON when rubbing brush 6 is in region A and is OFF when rubbing brush 6 is in region B. CPU circuit 14 thus can detect whether lens frame 5 is in region A or in region B. Rubbing brush 6 is positioned in region B in the reset condition prior to focussing action of lens frame 5. After rubbing brush 6 has moved into region A under forward rotation of focussing motor 9, CPU circuit 14 begins to count the pulse signals output from photo-interrupter 7 and stops focussing motor 9 when it has counted to a certain preset value.

Exposure control circuit 11 controls shutter diaphragm 2 through control signals from CPU circuit 14, based on photometry values, that is, measured light values, supplied to CPU circuit 14 from photometry circuit 12. Distance measuring circuit 13 measures distance to the subject and supplies a distance signal to CPU circuit 14. CPU circuit 14 computes the proper focus position of photographic lens 1, based on the distance signal, and causes focussing motor 9 to rotate forward via motor drive circuit 10. Lens frame 5 thus starts to move to the left in FIG. 1. CPU circuit 14 stops rotation of focussing motor 9 when the counted value of the pulse signals output from photo-interrupter 7 matches a preset value.

Switch S1, which is connected to CPU circuit 14, includes a half-depression switch that initiates photometry by photometry circuit 12 and distance measurement by distance measuring circuit 13. Switch S2 also includes a release switch, that is, a full-depression switch, that directs rotation of focussing motor 9 and exposure of photographic film 16 by shutter diaphragm 2. Both switches are pressure-operated by the photographer. Film winding circuit 15 is controlled by CPU circuit 14 and winds photographic film 16 one frame, after exposure of photographic film 16, in preparation for the next photograph. Film winding circuit 15 also rewinds photographic film 16 when all photographs on photographic film 16 have been taken.

CPU circuit 14 is connected to half-depression switch S1, which turns ON when the release button is depressed halfway, and to release switch S2, which turns ON when the release button is completely depressed. CPU circuit 14 also is connected to main switch S4, which starts the operations of the camera. Main switch S4 is a status switch that has an ON position and an OFF position. Once the user sets main switch S4 to the ON position, it remains in the ON position until the user returns it to the OFF position.

In addition, CPU circuit 14 is connected to lens barrel switch S3, which recognizes the position of lens frame 5 and photographic lens 1 (hereafter referred to as the lens barrel), and to photo-interrupter 7. Furthermore, CPU circuit 14 also is connected to motor drive circuit 10. Lens barrel switch S3 is OFF when the lens barrel is stopped in its initial position and is ON when the lens barrel moves toward an extended position. Furthermore, CPU circuit 14 also is connected to exposure control circuit 11, photometry circuit 12, distance measuring circuit 13, and film winding circuit 15.

CPU circuit 14 preferably is a single-chip microcomputer, which controls all of the operational sequences of the camera. The processes shown in the flow charts in FIGS. 2–5B represent programs loaded into CPU circuit 14 that relate to the present invention. In addition, the timer, counter, etc. noted in the flow charts are loaded in CPU circuit 14.

Motor drive circuit 10 controls motor 9 through control signals from CPU circuit 14, motor 9 driving the lens barrel. The lens barrel scrolls out (focussing) during forward rotation of motor 9, and scrolls in (reverse focussing) during reverse rotation of motor 9. When the lens barrel moves because power is supplied to motor 9, photo-interrupter 7 detects the movement of the lens barrel. The output signal LPI of photo-interrupter 7 reverses every time the lens barrel moves a preset value, and the output signal is supplied to CPU circuit 14. As a result, photo-interrupter 7 outputs a pulse string, the number of pulses corresponding to the amount of movement of the lens barrel.

CPU circuit 14 counts the number of pulses input to the LPI terminal after lens barrel switch S3 is reversed, with the base position being the position where lens barrel switch S3 is switched from OFF to ON. Subsequently, the lens barrel is moved to a preset position by cutting the power to motor 9 when a preset number of pulses have been counted. The pulse number is determined in accordance with the results of distance measurements conducted by distance measuring circuit 13. Focussing is completed by moving the lens barrel until the desired number of pulses determined by the distance measurement has been attained.

Figure 2:
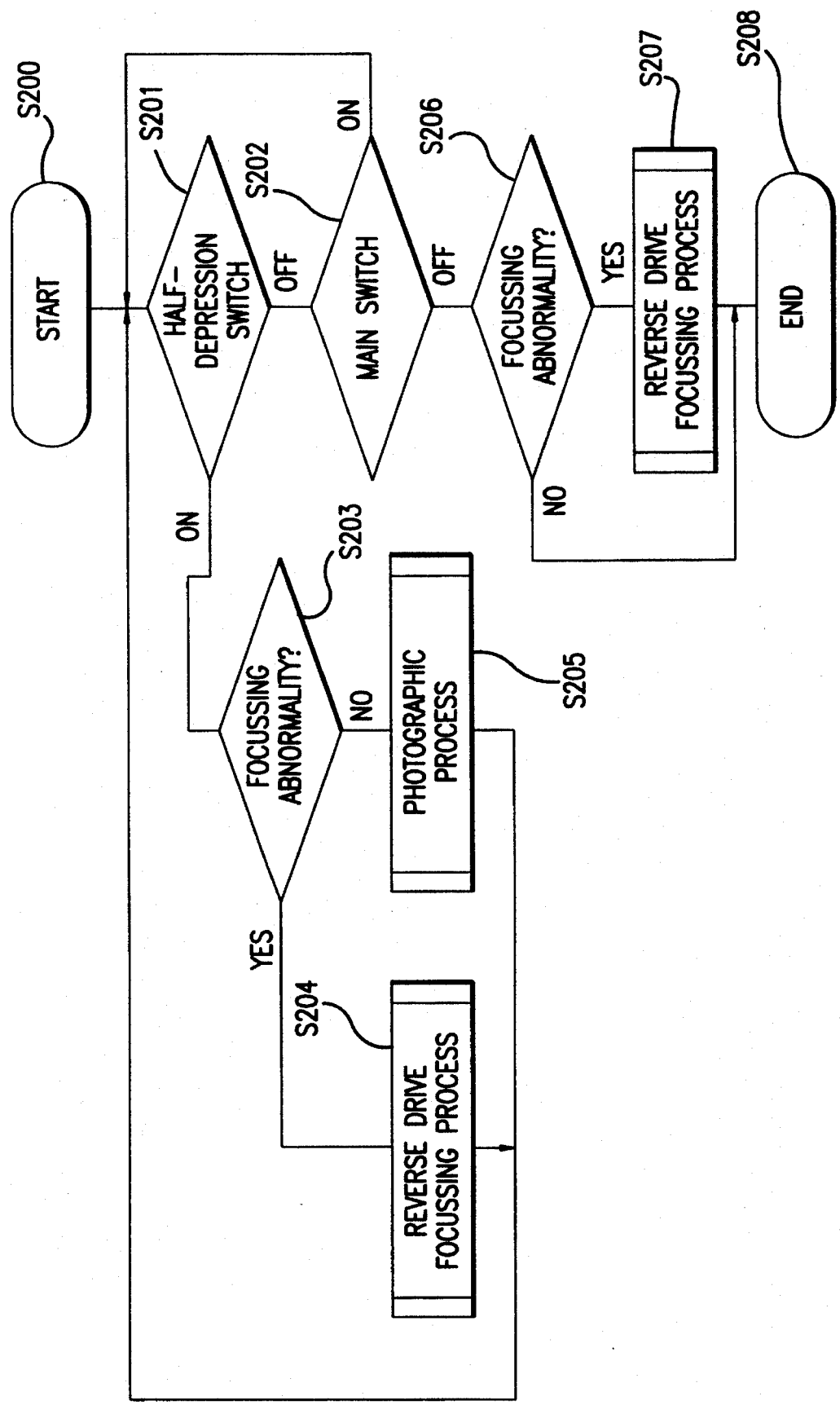
FIG. 2 is a flow chart showing operation of the FIG. 1 camera.

FIG. 2 is a flow chart showing a main routine of CPU circuit 14. The power source already has been installed and main switch S4 already has been turned ON. The process starts with step S200.

First, CPU circuit 14 executes a loop containing steps S201 and S202, waiting in step S201 for half-depression switch S1 to turn ON and in step S202 for main switch S4 to turn OFF.

When half-depression switch S1 is ON in step S201, the CPU advances to step S203 where it is determined whether a focussing abnormality still exists from any previous focussing drive process. If no focussing abnormality exists, the CPU advances to step S205 and executes the photographic process. If a focussing abnormality exists in step S203, a reverse focussing drive process is executed in step S204. After step S204 or S205 has been completed, the CPU returns to the loop containing steps S201 and S202 and continues to read half-depression switch S1 and main switch S4.

When it is determined in step S202 that main switch S4 is OFF, the CPU advances to step S206, where it is determined whether a focussing abnormality exists from a preceding focussing drive. If no focussing abnormality exists, the CPU advances to step S208 and the process is concluded. If a focussing abnormality exists in step S206, a reverse focussing drive process is executed in step S207, and the CPU advances to step S208, where the process is concluded. Following this, the CPU waits for main switch S4 to be turned ON again. When main switch S4 is turned ON, the process is started from step S200.

Figure 3:
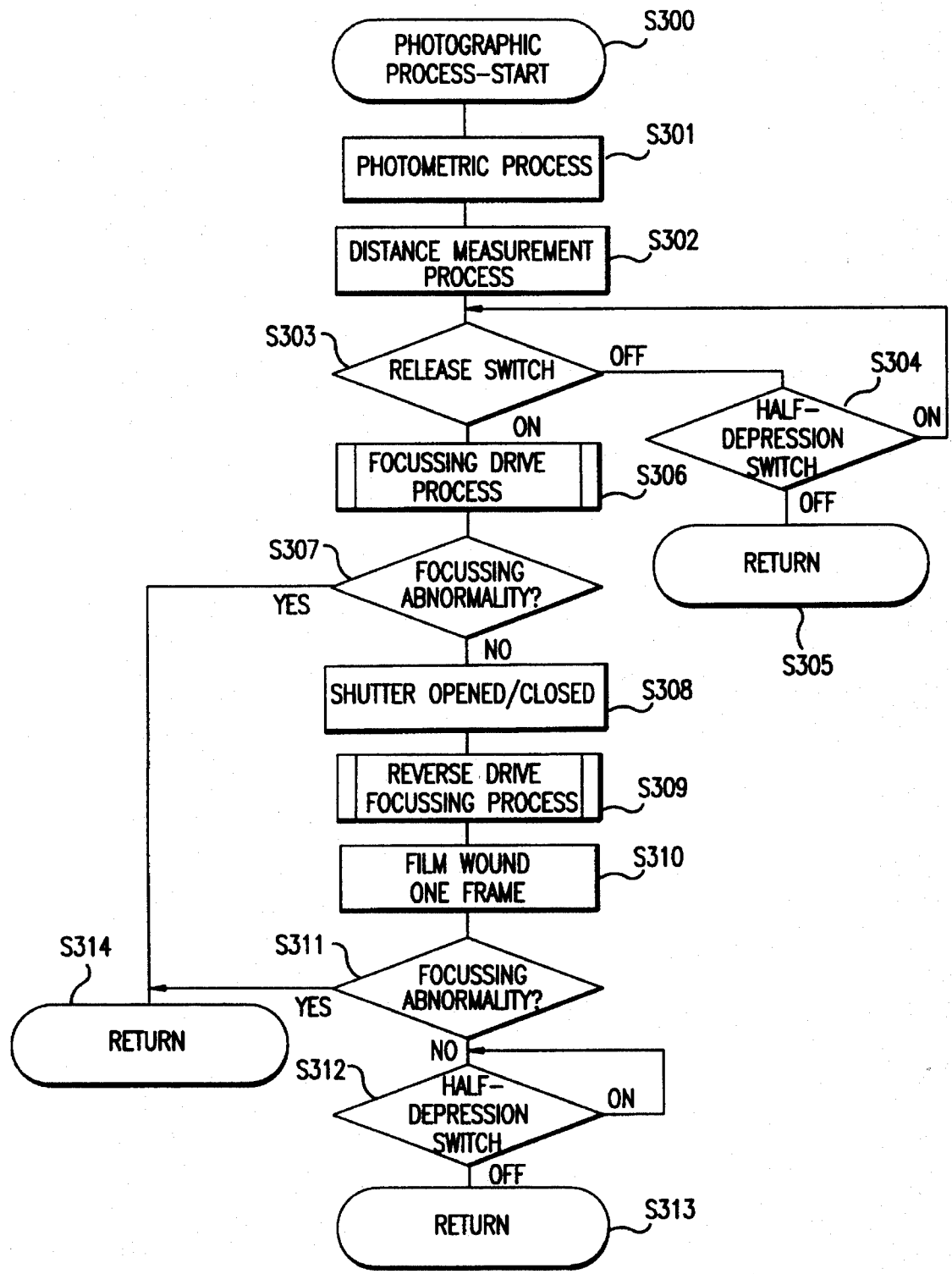
FIG. 3 is a flow chart showing a photographic process of step S205 of FIG. 2.

FIG. 3 is a flow chart of the photographic process routine. The process starts in step S300 when the photographic process is called for in step S205 of FIG. 2.

In step S301, CPU circuit 14 sends a signal to photometry circuit 12 to execute the photometry process. The brightness of the subject is calculated from the amount of light incident on a photoreceptor element (not shown) in photometry circuit 12, and the shutter aperture time is obtained. Next, in step S302, the CPU sends a signal to distance measuring circuit 13 to initiate the distance measuring process. When distance measurement has been completed, distance measuring circuit 13 outputs the distance measurement results to CPU circuit 14, following which the CPU advances to the loop containing steps S303 and S304. If it is determined in step S304 that half-depression switch S1 is OFF, the process is concluded in step S305. In this case, a photograph is not taken.

If it is determined in step S303 that release switch S2 is ON, the CPU advances to step S306. In step S306, a focussing drive process is executed, and the lens barrel is driven to a preset position according to the distance measurement found in step S302. Details of the focussing drive process will be provided hereafter. When a focussing abnormality is detected in step S307 after the completion of the focussing drive process, the CPU returns from step S314 to step S201 (FIG. 2).

If there is no focussing abnormality in step S307, the shutter is opened and closed in step S308, based on the aperture time found in step S301. Then, in step S309, the reverse focussing drive process is executed to return the lens barrel to its initial position. Details of the reverse focussing drive process will be provided hereafter. The film is wound one frame in step S310, and then it is determined in step S311 whether a focussing abnormality exists. If a focussing abnormality is detected, the CPU returns from step S314 to step S201 (FIG. 2). If no focussing abnormality is detected in step S311, the CPU advances to step S312 and waits for half-depression switch S1 to be turned OFF. When it is determined that half-depression switch S1 is OFF, the process is concluded in step S313 and the CPU returns to step S201 (FIG. 2).

The determination of focussing abnormality is not made immediately after the reverse focussing drive process (step S309), to prevent double-exposure of the film. Execution of the reverse focussing drive process indicates that focussing is normal and that the exposure has been completed. Thus it is necessary to wind the film, even if the reverse focussing is abnormal. If winding were not executed, a double exposure would result between the immediately previous photograph and a photograph taken the next time the focussing is normal.

Figure 4A:
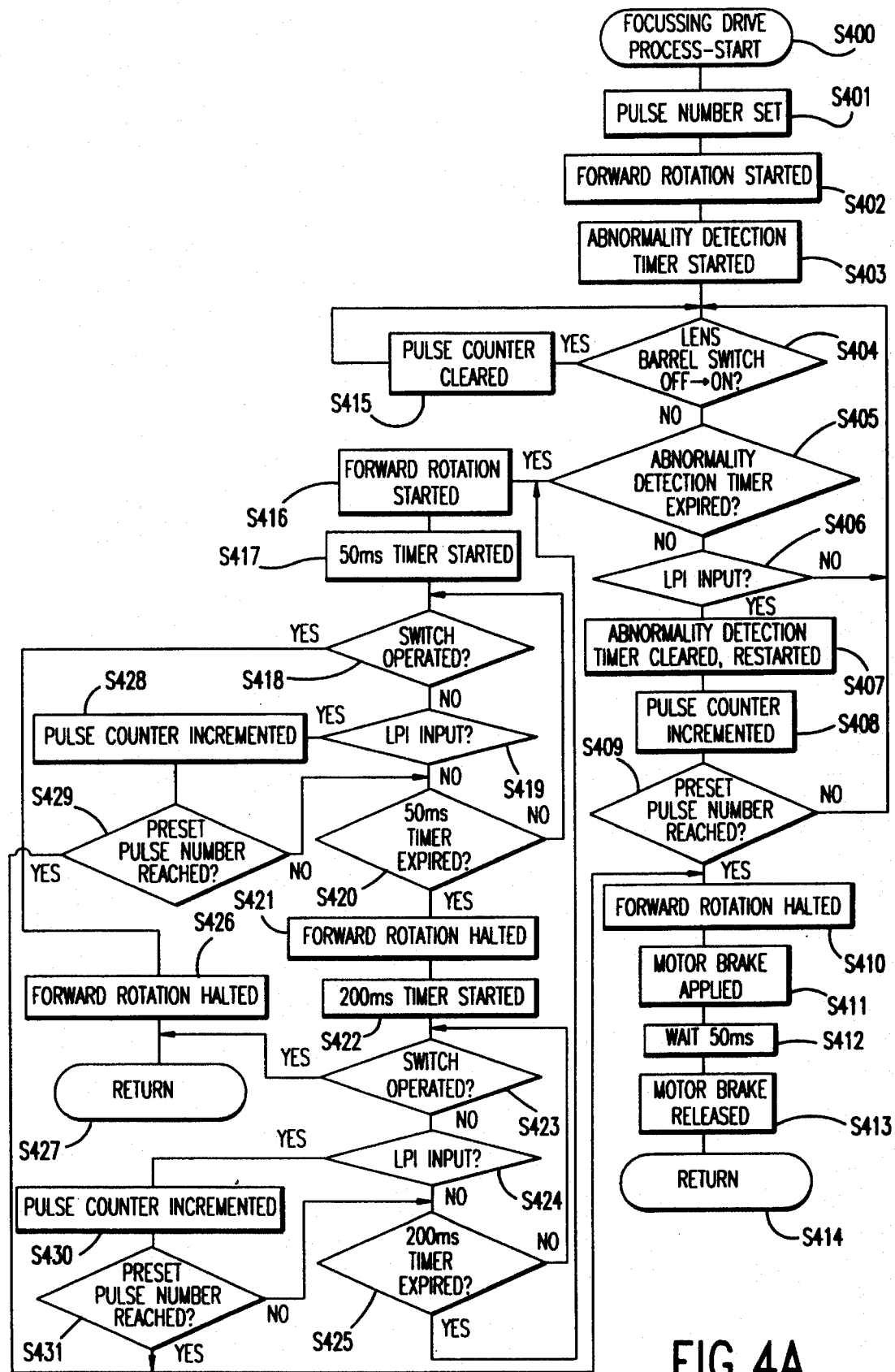
FIG. 4A is a flow chart showing a focussing drive process of step S306 of FIG. 3.
Figure 4B:
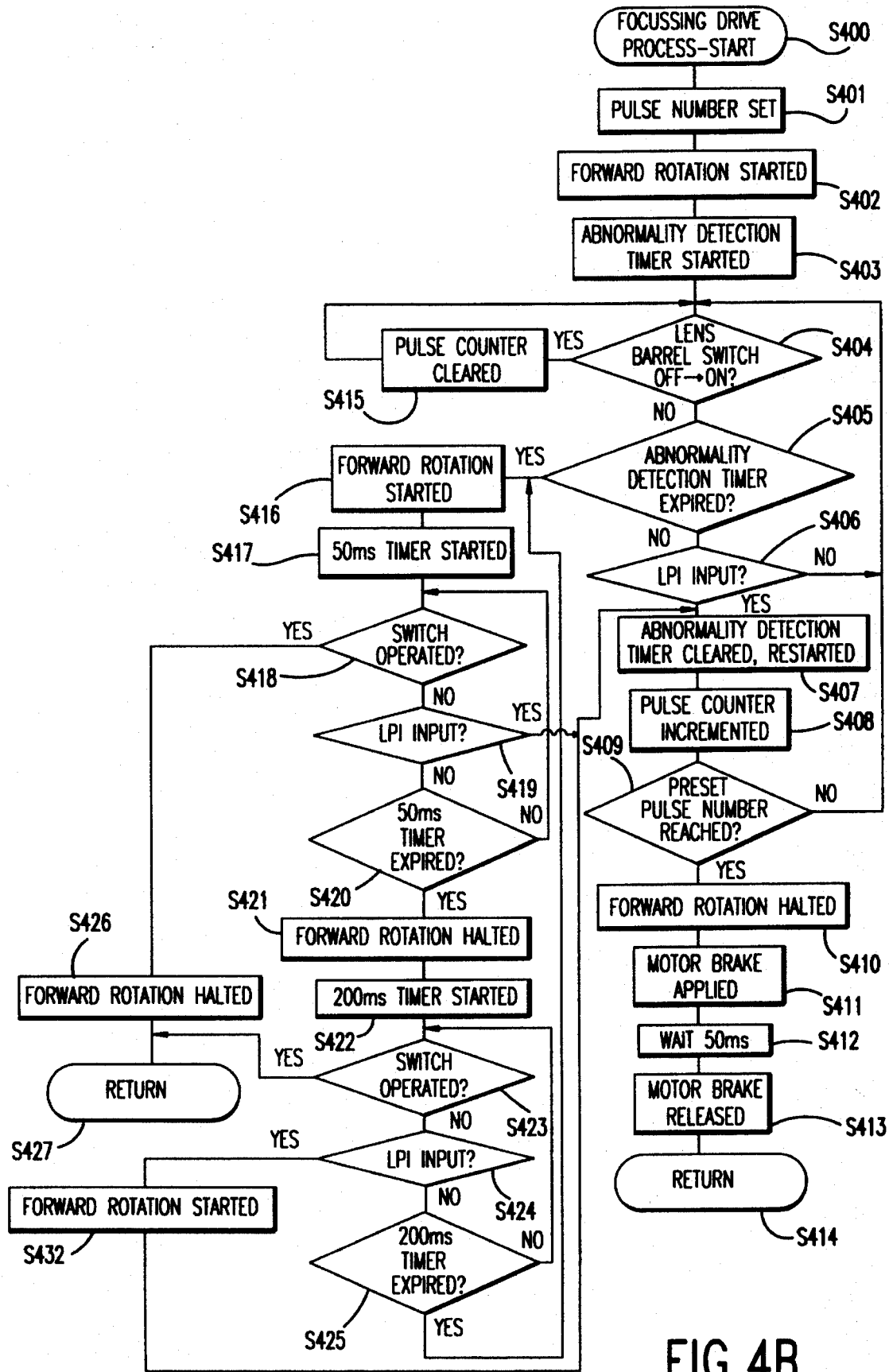
FIG. 4B is a flow chart showing an alternative focussing drive process of step S306 of FIG. 3.

FIGS. 4A–4B are flow charts showing focussing drive process routines. The contents of step S306 (FIG. 3) correspond to the focussing drive processes of FIGS. 4A–4B. Like steps in FIGS. 4A–4B are denoted by like reference numerals.

When the focussing drive process of FIG. 4A is called for in step S306 of FIG. 3, the process starts from step S400. First, in step S401, a drive pulse number is set. An amount of lens barrel movement (scrolling) necessary for proper focussing is determined from the previously obtained subject distance, and the movement amount is converted into a pulse number for photo-interrupter 7. Next, in step S402, motor 9 is rotated forward, and an abnormality detection timer is started in step S403. Subsequently, in the loop containing steps S404, S405 and S406, the CPU waits for lens barrel switch S3 to switch from OFF to ON, the time on the abnormality detection timer to expire, or the LPI to be input. In this instance, when the lens barrel moves normally, the LPI is input within 3 ms. The abnormality detection timer is set at 1 second, which is a sufficient time relative to the 3 ms within which the LPI normally is input.

When it is determined in step S404 that lens barrel switch S3 has turned ON, the pulse counter in CPU circuit 14 is cleared to 0 in step S415. The turning ON of lens barrel switch S3 occurs only once immediately following the commencement of lens barrel scrolling, and the pulse count is begun at a base position of the lens barrel. From step S415, the CPU returns to the loop containing steps S404, S405 and S406.

When the LPI is input in step S406, the abnormality detection timer is cleared and restarted in step S407. If the LPI is continuously input, therefore, the time on the abnormality detection timer does not expire. Next, in step S408, the pulse counter is incremented by one. Furthermore, in step S409, it is determined whether the pulse counter has reached the preset pulse number set in step S401. If the preset pulse number has not been reached, the CPU returns to the loop containing steps S404, S405 and S406.

When the preset pulse number has been reached in step S409, the lens barrel has been scrolled to the desired position. Forward rotation of motor 9 is halted in step S410, and a brake is applied in steps S411 through S413. Subsequently, the CPU returns from step S414 to FIG. 3.

If the LPI is not input within 1 second, the time on the abnormality detection timer expires in step S405. With the expiration of the time on the timer, the CPU advances to step S416 and initiates a pulsed current supply, in which current is on for 50 ms and off for 200 ms.

In step S416, forward rotation of motor 9 is started, and in step S417, a 50 ms timer is started. Subsequently, the CPU executes the loop containing steps S418, S419 and S420. In step S418, when operation of half-depression switch S1 or main switch S4 is detected, forward rotation of motor 9 is halted in step S426 and the CPU returns from step S427 to step S306 (FIG. 3). When the LPI input is detected in step S419, the pulse counter is incremented by 1 in step S428, and it is determined in step S429 whether the preset pulse number has been reached. If the preset pulse number has not been reached, the CPU returns to the loop containing steps S418, S419 and S420. If the preset pulse number has been reached, the CPU advances to step S410 and concludes the driving process in the same way as when the preset pulse number is reached in step S409.

When the time on the 50 ms timer expires in step S420, the CPU advances to step S421, halts forward rotation of motor 9, and starts a 200 ms timer in step S422. The process of steps S422–S425 and S430–S431 is the same as the process of steps S417–S420 and S428–S429, so additional explanation of those steps is omitted. When expiration of time on the timer is detected in step S425, the CPU returns to step S416 and starts a 50 ms interval of forward rotation of motor 9. By repeating this process, a pulsed current consisting of 50 ms of forward rotation and 200 ms of stopping is generated.

FIG. 4B is a flow chart showing an alternative focussing drive process. The FIG. 4B process differs from the FIG. 4A process in that when LPI input is detected in step S419, the CPU advances to step S407 and thus returns to the normal forward drive loop for the lens barrel. When the time on the 50 ms timer expires in step S420, the CPU advances to step S421, halting forward rotation of motor 9, and then a 200 ms timer is started in step S422. The process of steps S423–S425 is the same as the process of steps S418–S420, so additional explanation of those steps is omitted. However, when LPI input is detected in step S424, the CPU returns to step S407 after starting forward rotation of motor 9 in step S432. When expiration of time on the timer is detected in step S425, the CPU returns to step S416 and starts a 50 ms interval of forward rotation of motor 9. By repeating the process, a pulsed current consisting of 50 ms of forward rotation and 200 ms of stopping is executed.

Figure 5A:
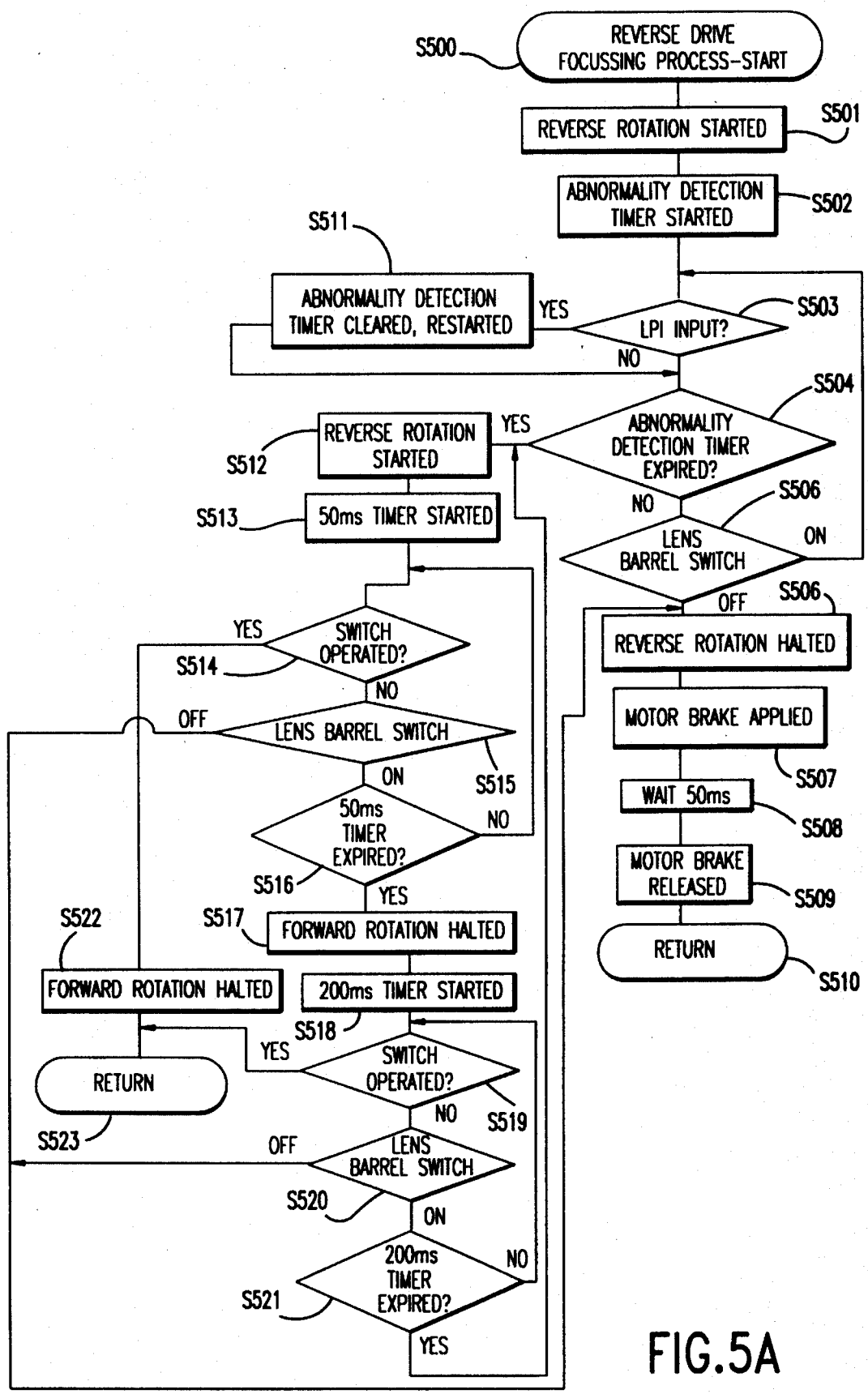
FIG. 5A is a flow chart showing a reverse focussing drive process of steps S204 and S207 of FIG. 2 and step S309 of FIG. 3.
Figure 5B:
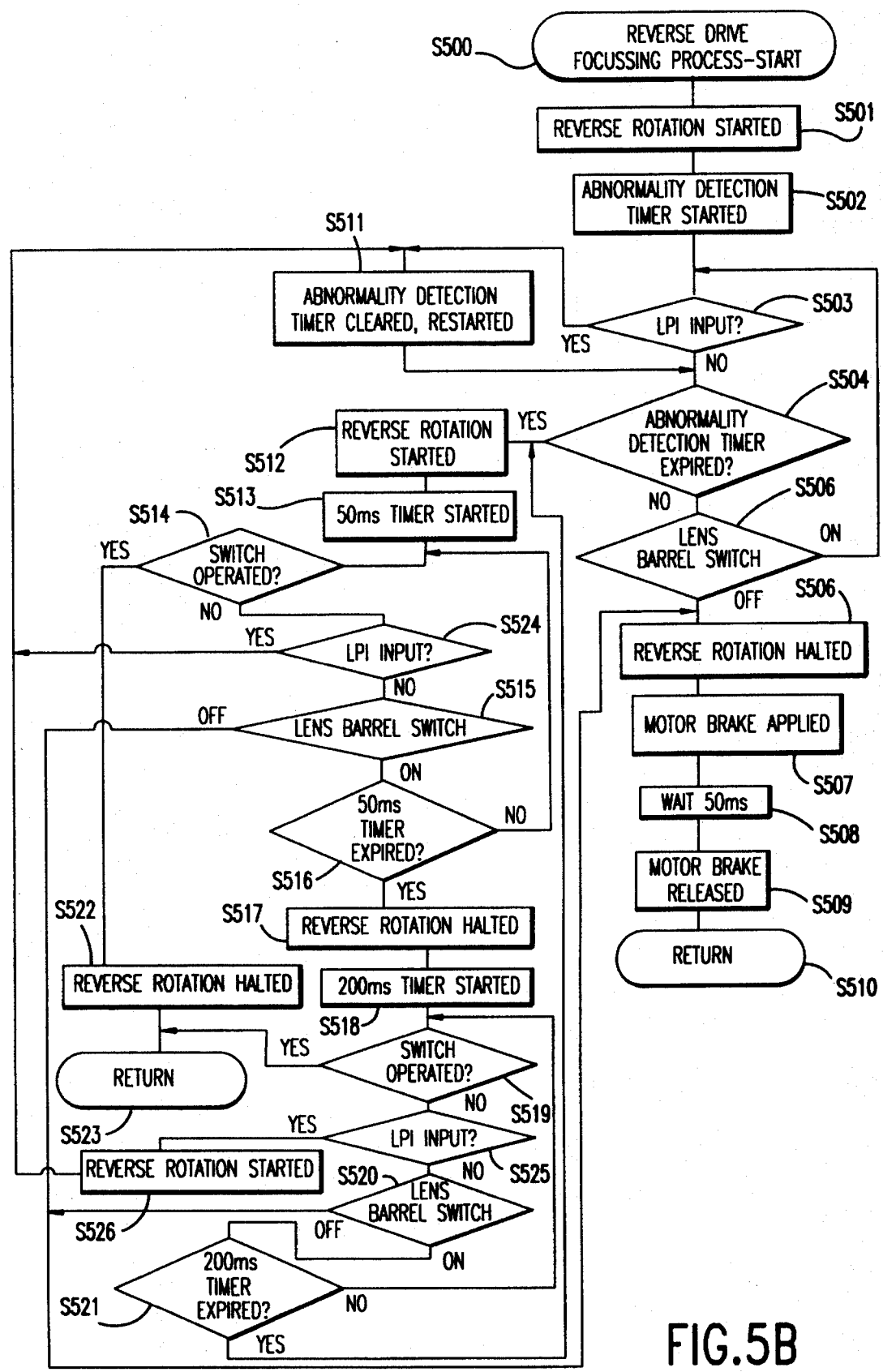
FIG. 5B is a flow chart showing an alternative reverse focussing drive process of steps S204 and S207 of FIG. 2 and step S309 of FIG. 3.

FIGS. 5A–5B are flow charts showing reverse focussing drive process routines. The contents of steps S204 and S207 in FIG. 2 and step S309 in FIG. 3 correspond to the reverse focussing drive processes in FIGS. 5A–5B.

After the process begins in step S500, motor 9 is reversed in step S501 and the abnormality detection timer is started in step S502. Subsequently, in the loop containing steps S503, S504 and S505, the CPU waits for lens barrel switch S3 to be turned OFF, the time on the abnormality detection timer to expire, or the LPI to be input. Here, when the lens barrel moves normally, the LPI is input within 3 ms. The abnormality detection timer is set at 1 second, which is a sufficient time relative to the 3 ms.

When the LPI is input in step S503, the abnormality detection timer is cleared and restarted in step S511. If the LPI is continuously input, therefore, the time on the abnormality detection timer does not expire. Subsequently, the CPU returns to the loop containing steps S503, S504 and S505.

When it is verified in step S505 that the lens barrel switch has been turned OFF, because the lens barrel already has been scrolled to the desired position (i.e., back to its initial position), reverse rotation of motor 9 is halted in step S506, and a brake is applied in steps S507 through S509. Subsequently, the CPU returns from step S510 to the original flow chart (step S204, step S207 or step S309).

When the LPI is not input after 1 second, the time on the abnormality detection timer expires in step S504. With the expiration of the time on the timer, the CPU advances to step S512 and initiates a pulsed current supply in which current is on for 50 ms and off for 200 ms.

In step S512, reverse rotation of motor 9 is started, and in step S513, a 50 ms timer is started. Subsequently, the CPU executes the loop containing steps S514–S517. In step S514, when operation of half-depression switch S1 or main switch S4 is detected, reverse rotation of motor 9 is halted in step S522 and the CPU returns from step S523 to the original flowchart (step S204, step S207 or step S309). When it is detected in step S515 that lens barrel switch S3 is OFF, the CPU advances to step S506 and concludes the driving process in the same way as when lens barrel switch S3 is OFF (step S505) during normal driving conditions.

When the time on the 50 ms timer expires in step S516, the CPU advances to step S517, halts reverse rotation of motor 9, and starts a 200 ms timer in step S518. The process from steps S519 through S521 is the same as the process in steps S514 through S516, so additional explanation of those steps is omitted. When expiration of time on the timer is detected in step S521, the CPU returns to step S512 and starts a 50 ms interval of reverse rotation of motor 9. By repeating the process, a pulsed current consisting of 50 ms of reverse rotation and 200 ms of stopping is generated.

FIG. 5B is a flow chart showing an alternative reverse focussing drive process. The FIG. 5B process differs from the FIG. 5A process in that after step S514, when LPI input is detected in step S524, the CPU returns to step S511 and continues the normal drive process. When it is determined in step S515 that lens barrel switch S3 is OFF, the CPU advances to step S506 and concludes the driving process in the same way as when lens barrel switch S3 is OFF during normal driving conditions (step S505).

When the time on the 50 ms timer expires in step S516, the CPU advances to step S517, halts reverse rotation of motor 9, and starts a 200 ms timer in step S518. The process of steps S519–S521 and S525 is the same as the process of steps S514–S516 and S524, so additional explanation of those steps is omitted. However, when LPI input is detected in step S525, the CPU returns to step S511 after starting reverse rotation of motor 9 in step S526. In addition, when expiration of time on the timer is detected in step S521, the CPU returns to step S512 and starts a 50 ms interval of reverse rotation of motor 9. By repeating the process, a pulsed current consisting of 50 ms of reverse rotation and 200 ms of stopping is generated.

As explained above, a camera according to these embodiments of the invention switches to a pulsed current supply when an abnormal condition in the lens barrel is detected, due to the application of an external or similar force on the lens barrel. The camera also continues to count pulse signals output by photo-interrupter 7 and returns to a full current supply state when input from photo-interrupter 7 is detected. Thus, damage to the lens barrel is prevented and a return to a normal lens barrel driving condition becomes possible when the external force is removed. In addition, it also is possible to halt the current supply when a switch is operated at the initiative of the user.

Figure 6:
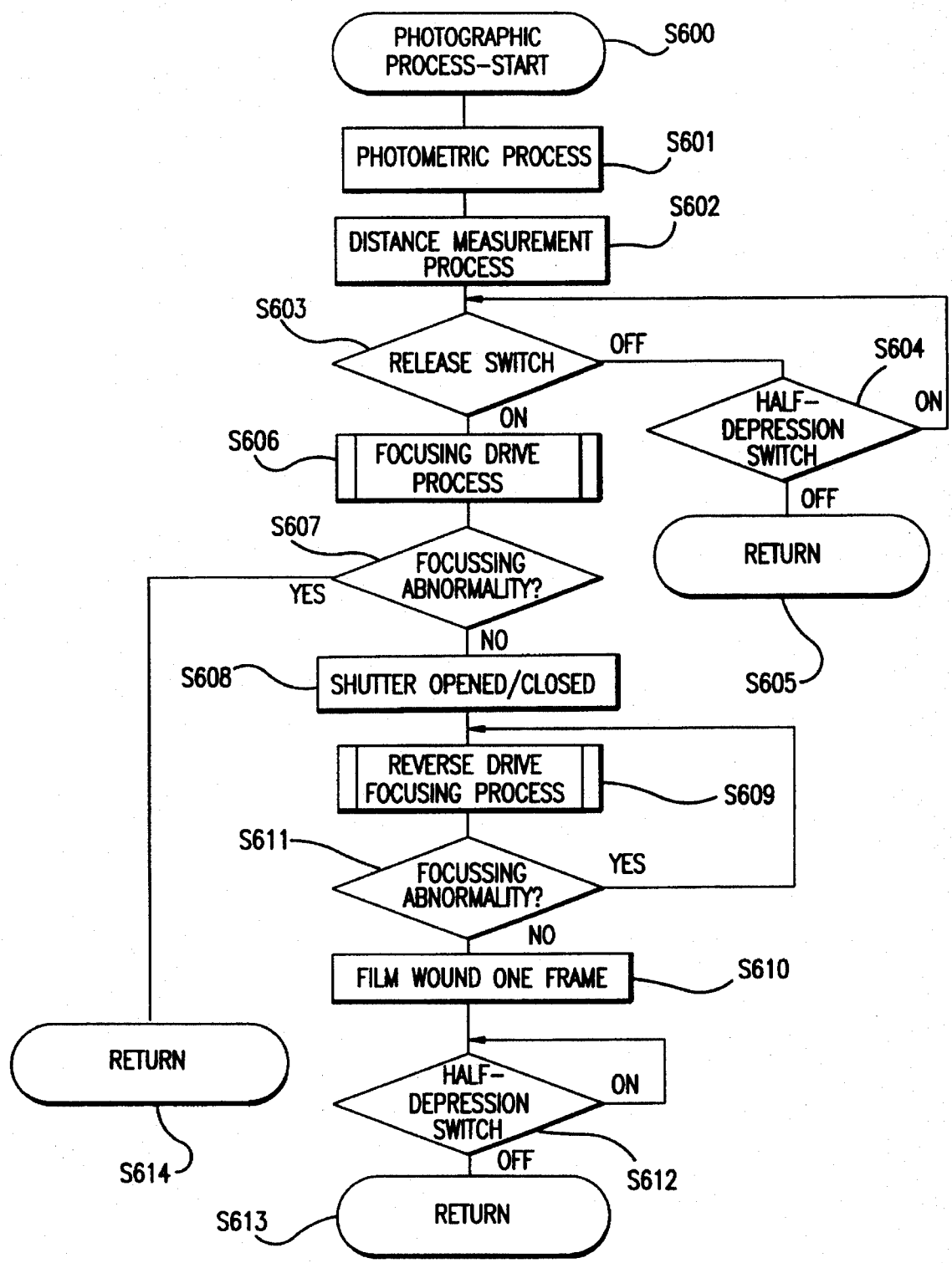
FIG. 6 is a flow chart showing an alternative photographic process of step S205 of FIG. 2.
Figure 7A:
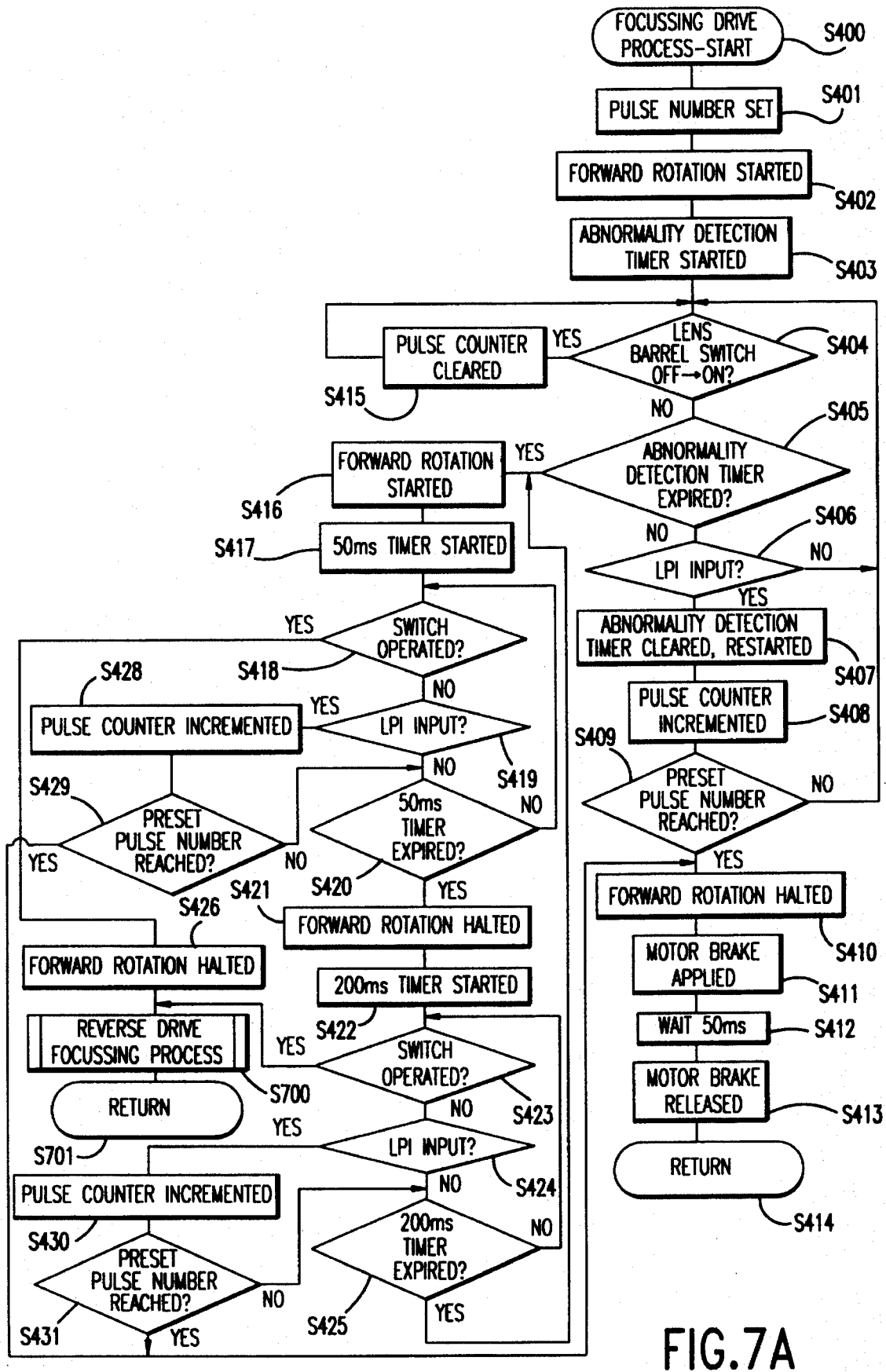
FIG. 7A is a flow chart showing a focussing drive process of step S606 of FIG. 6.
Figure 7B:
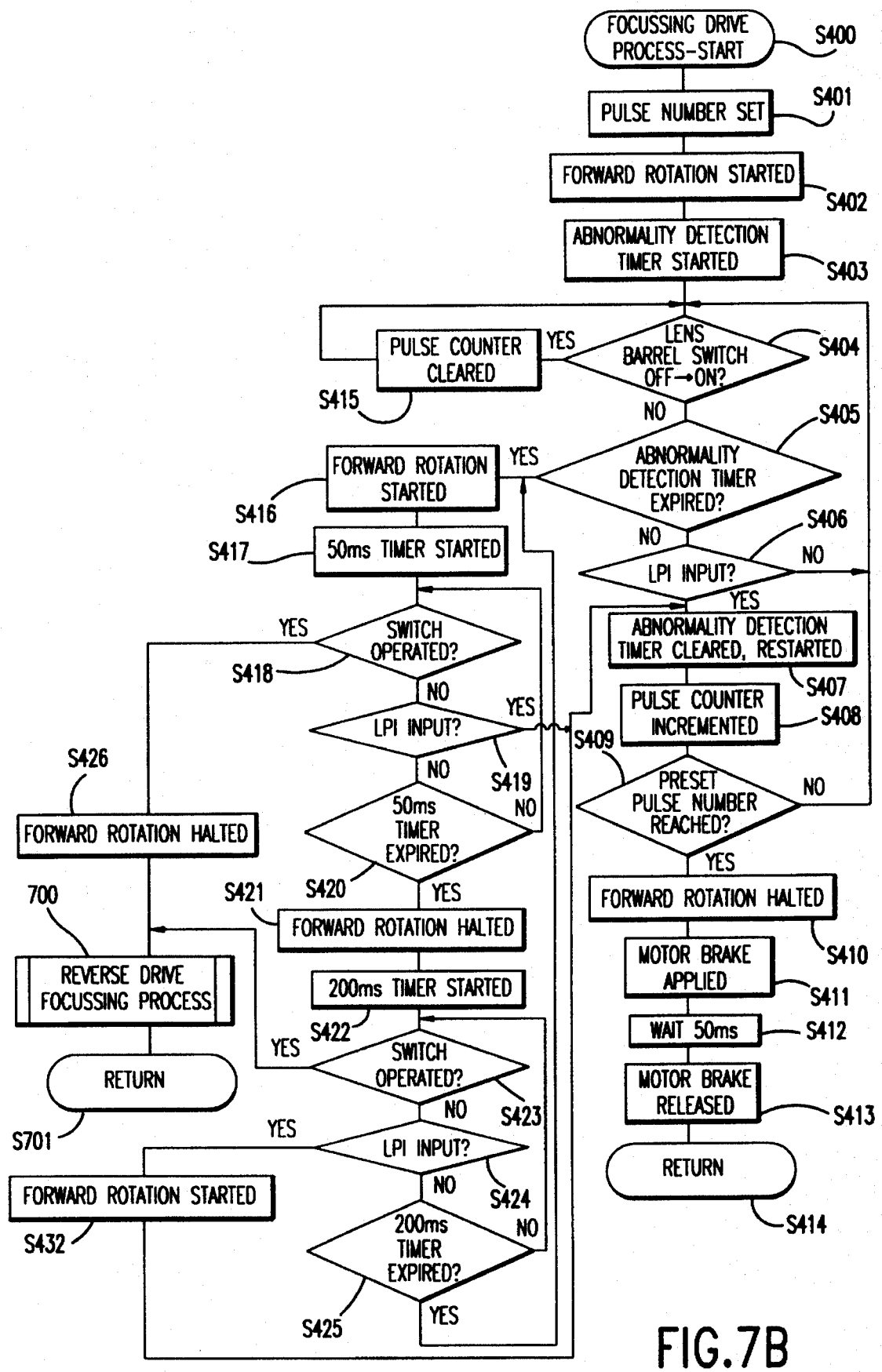
FIG. 7B is a flow chart showing an alternative focussing drive process of step S606 of FIG. 6.
Figure 8A:
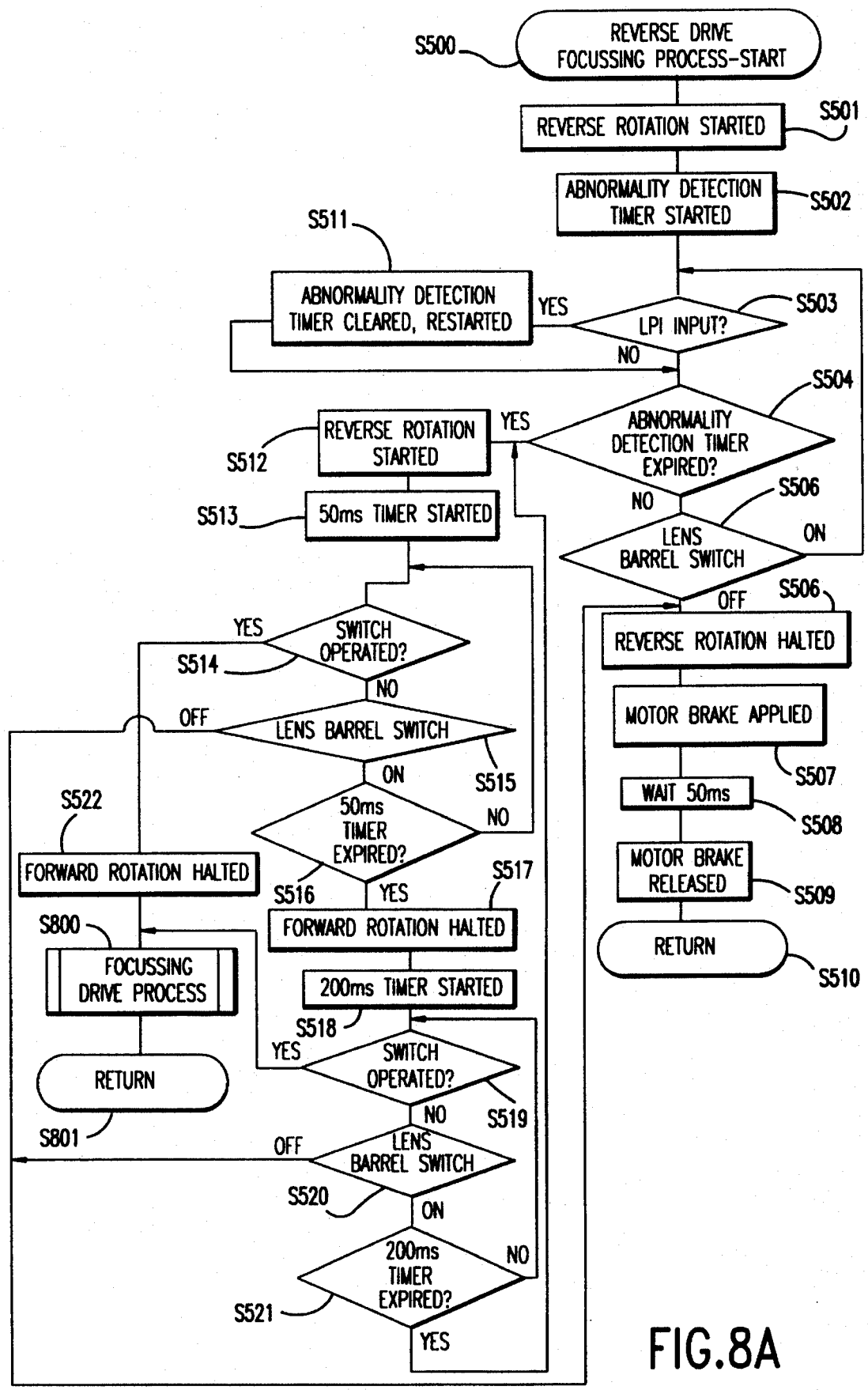
FIG. 8A is a flow chart showing a reverse focussing drive process of step S609 of FIG. 6 and step S700 of FIG. 7A.
Figure 8B:
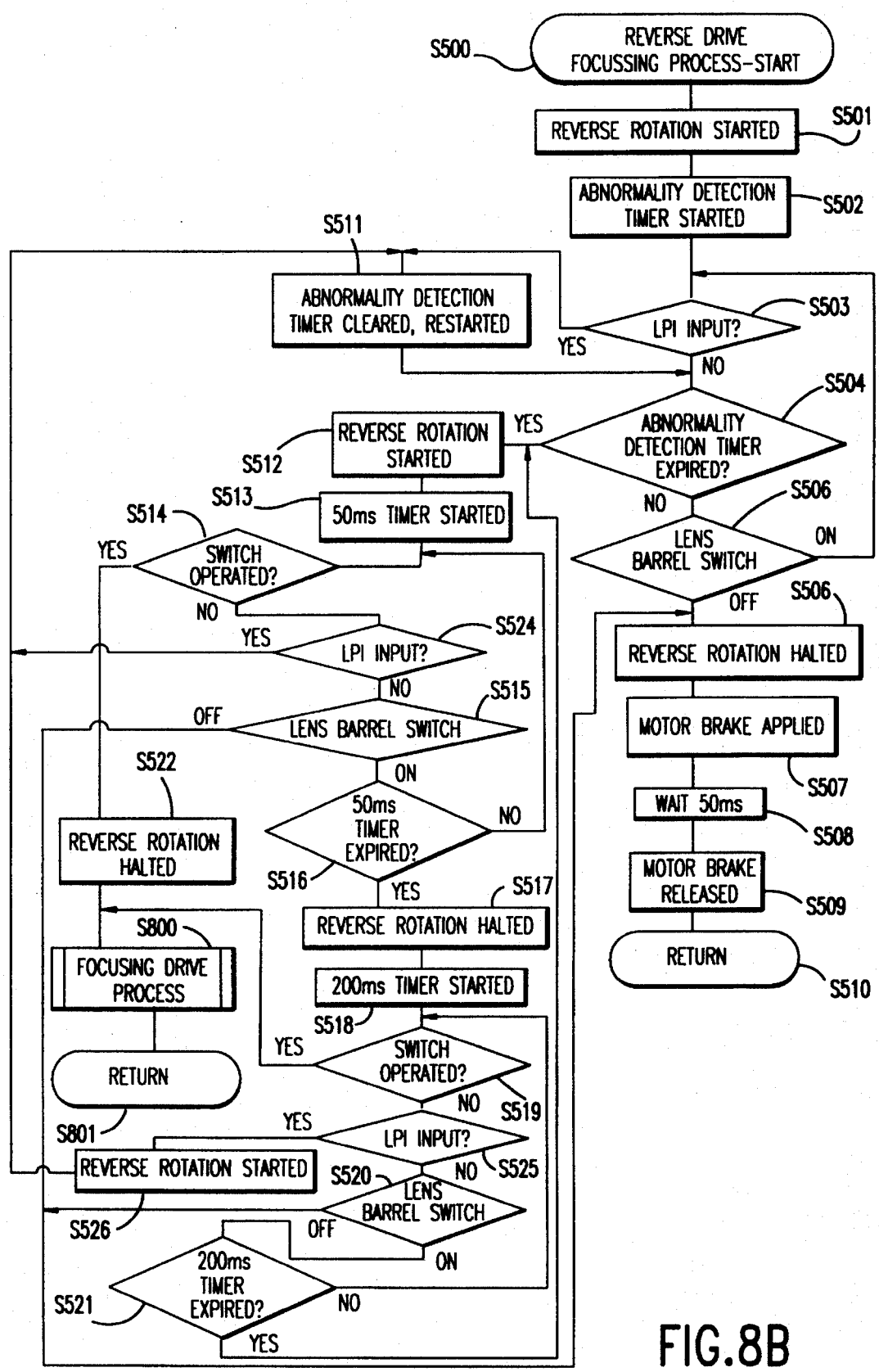
FIG. 8B is a flow chart showing an alternative reverse focussing drive process of step S609 of FIG. 6 and step S700 of FIG. 7B.

According to further embodiments, FIG. 3 of the previous embodiments is replaced by FIG. 6, FIGS. 4A–4B by FIGS. 7A–7B, and FIGS. 5A–5B by FIGS. 8A–8B. In the previous embodiments, after the change is made to a pulsed current supply following detection of lens barrel abnormality, the process is concluded by halting lens barrel driving when either half-depression switch S1 or main switch S4 is operated. However, in the further embodiments, reverse driving of the lens barrel is executed simultaneously with the operation of half-depression switch S1 or the main switch S4. Components and steps that are the same as in FIGS. 1–5 have the same reference numbers, and further explanation of those components and steps is omitted.

When the reverse focussing process is concluded in step S609 of FIG. 6, it is determined in step S611 whether focussing abnormalities exist. Because a focussing abnormality causes the reverse focussing drive process to be executed again in step S609, a focussing abnormality causes scrolling out of the lens barrel by the focussing drive in step S800 (FIGS. 8A–8B). When it is determined in step S611 that the reverse focussing process is normal, the film is wound one frame in step S610.

The difference between FIGS. 7A–7B and 4A–4B is the process executed when it is determined in steps S418 and S423 that half-depression switch S1 or main switch S4 is ON. In FIGS. 7A–7B, when it is verified in step S418 that half-depression switch S1 or main switch S4 is ON, forward rotation of motor 9 is halted in step S426 and the reverse focussing process is executed in step S700. Subsequently, the CPU returns from step S701 to step S606 of FIG. 6. When it is determined in step S423 that half-depression switch S1 or main switch S4 is ON, the reverse focussing process is executed in step S700. Subsequently, the CPU returns from step S701 to step S606 of FIG. 6.

The difference between FIGS. 8A–8B and 5A–5B is the process executed when it is determined in steps S514 and S519 that half-depression switch S1 or main switch S4 is ON. When it is determined in step S514 that half-depression switch S1 or main switch S4 is ON, reverse rotation of motor 9 is halted in step S522 and the reverse focussing process is called for in step S800. Subsequently, the CPU returns from step S801 to step S609 or step S700. When it is determined in step S519 that half-depression switch S1 or main switch S4 is ON, the reverse focussing process is called for in step S800. Subsequently, the CPU returns from step S801 to step S609 or step S700.

Figure 9:
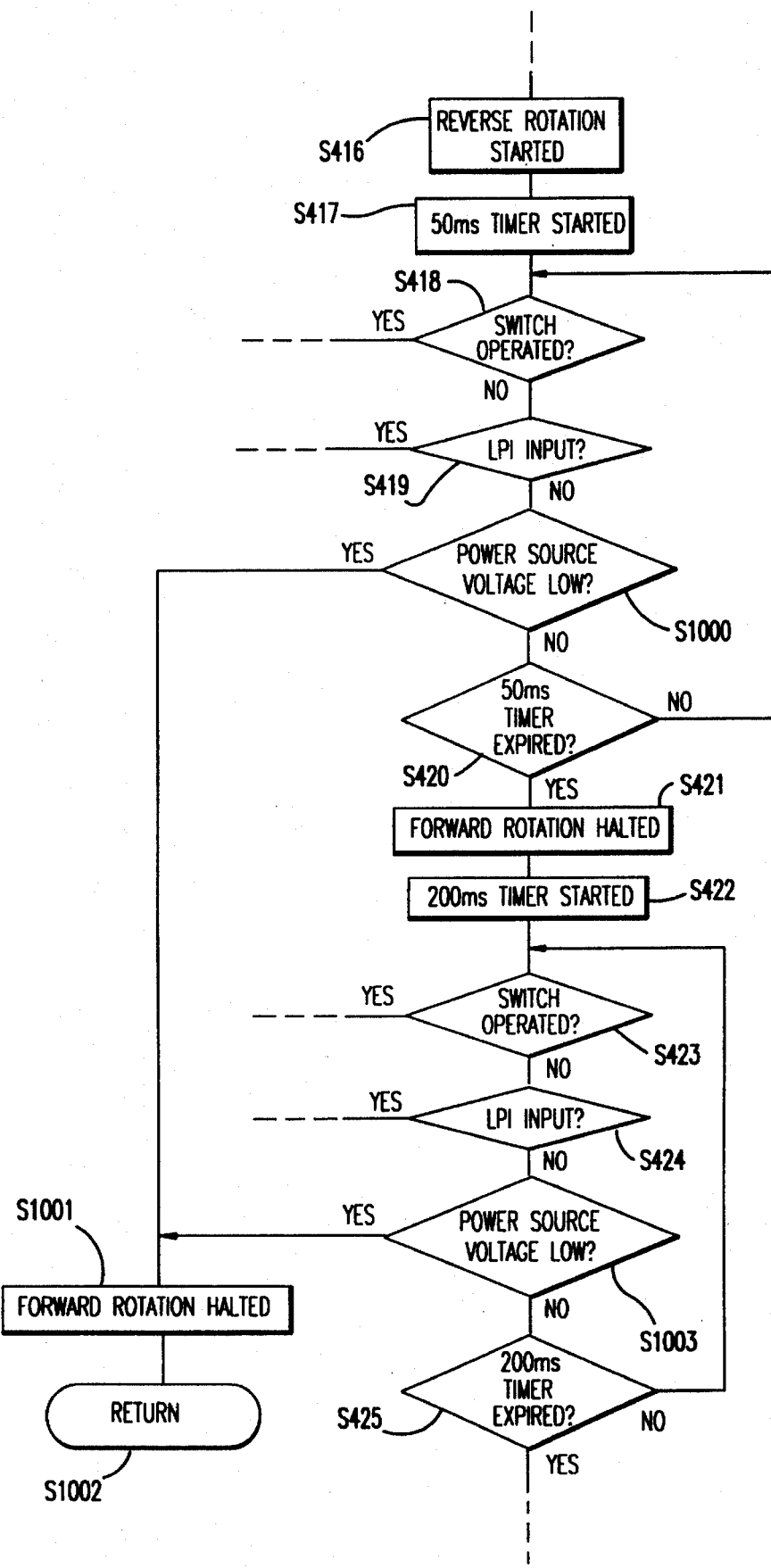
FIG. 9 is a flow chart showing a portion of an alternative focussing drive process of step S606 of FIG. 6.

An explanation of a further embodiment is provided hereafter, with reference to FIG. 9. This embodiment is similar to the embodiments of FIGS. 4A–4B and FIGS. 7A–7B, but halts the pulsed current supply if the voltage of a power source of the camera, such as a battery, drops below a predetermined level.

In FIG. 9, a process that reads the power source voltage is added in step S1000 to the loop containing steps S418 through S420. If the power source voltage falls below a predetermined value, the CPU advances to step S1001 and concludes the process after halting the current supply to motor 9 and thus halting rotation of motor 9. A process that reads the power source voltage in step S1003 also is added to the loop containing steps S423–S425. If the power source voltage falls below a preset value, the CPU also advances to step S1001. Thus, if the power source voltage drops during the execution of the pulsed current supply process, the pulsed current supply is halted even if the user does not operate any switches.

With the above embodiments, counting by photo-interrupter 7 is continued even after a change has been made to the pulsed current supply when a lens barrel abnormality is detected. Normal current supply operation is restored if even one pulse signal from photo-interrupter 7 is input, thereby enabling rapid driving of the lens barrel after the abnormality has been eliminated.

In addition, with the embodiments of FIGS. 3–5B, the current supply is halted when a switch is operated at the initiative of the user, thereby preventing power source drain and excessive loads on the mechanisms. In addition, with the embodiments of FIGS. 6–8B, current is supplied in the reverse direction immediately after operation of a switch, thereby increasing the opportunities for restoration from an abnormal condition.

Furthermore, with the embodiment of FIG. 9, current supply is automatically halted when power source voltage drops during pulsed current supply, thereby preventing power source drainage and circuit malfunction when power source voltage has dropped.

The embodiments discussed above are applicable to the focussing of a photographic lens, but also can be applied to drive control of a zoom lens zooming in and out, and to driving of the lens barrel between a photographic position and a collapsed position in a collapsible-mount-type camera.

With the present invention, as explained above, when it is detected that the photographic lens is not moving, i.e., when an abnormal condition is created by an external or similar force on the lens barrel, it is possible to prevent damage to the drive circuit and damage to the driving mechanism, while continuing to drive the photographic lens, because the drive speed is switched to a slower speed, causing the driving force to decline. In addition, it is possible to continue movement without complicated restorative action once the external force has been removed, even after the driving speed has been switched to a slower speed, because detection of the movement of the photographic lens is continued.

Figure 10:
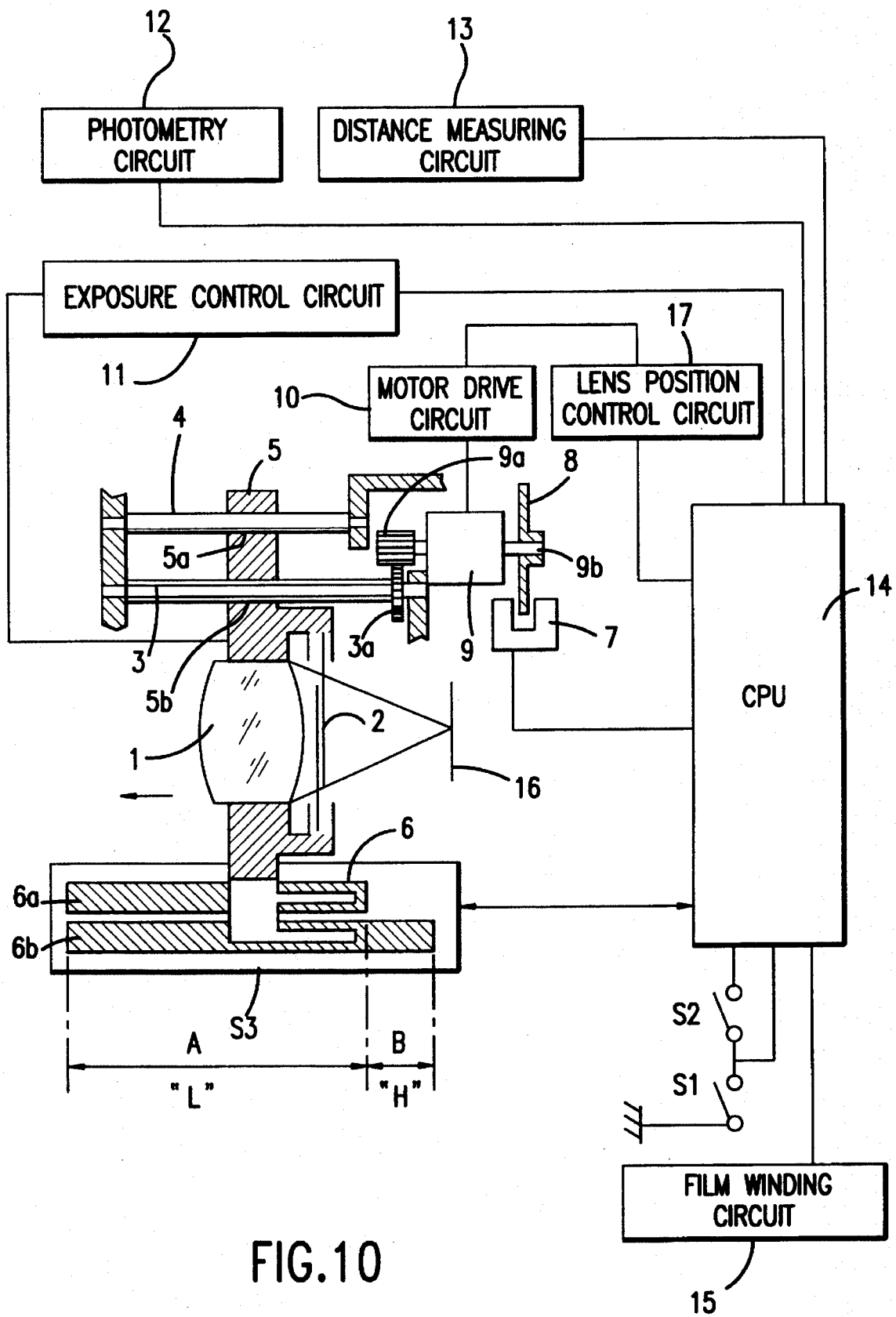
FIG. 10 is a block diagram of an auto-focus camera according to an embodiment of the invention.

FIG. 10 shows an auto-focus camera according to an embodiment of the invention. Like reference numerals in FIGS. 1 and 10 denote like components, which are described above. FIG. 10 also includes lens position control circuit 17. CPU circuit 14 regulates movement of lens frame 5 through focussing motor drive circuit 10 and lens position control circuit 17. Additionally, half-depression switch S1 and full-depression switch S2 together comprise an operating switch that is depressed by the photographer.

When rubbing brush 6 is in region A, a signal of level "L" is output from rubbing movement switch S3 to CPU circuit 14. When rubbing brush 6 is in region B, a signal of level "H" is output to CPU circuit 14. CPU circuit 14 thus can determine whether lens frame 5 is in region A or region B.

Figure 11:
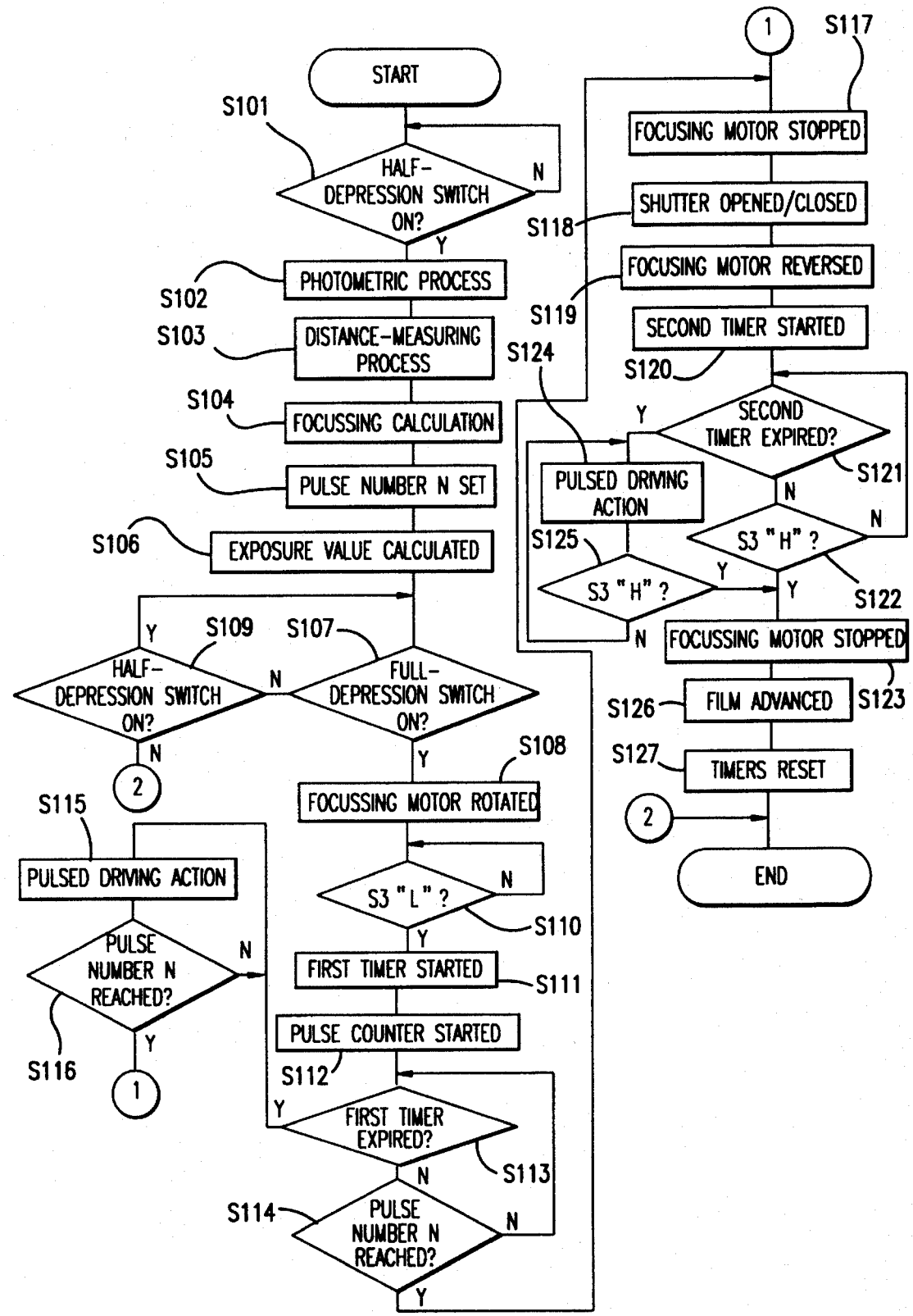
FIG. 11 is a flow chart showing operation of an auto-focus camera according to an embodiment of the invention.

The operation of CPU circuit 14 of FIG. 10 is described hereafter, with reference to the flow chart of FIG. 11.

In step S101, it is determined whether half-depression switch S1 is on or off. If it is on, photometric measurements and distance measurements are performed in steps S102 and S103. A focussing calculation is performed in step S104 based on the measured distance value, and a pulse number N is determined in step S105 that corresponds to the corresponding lens stopping position. In step S106, the exposure value is calculated, based on the amount of measured light.

In step S107, it is determined whether full-depression switch S2 is on or off. If switch S2 is off, it is determined in step S109 whether half-depression switch S1 is on or off. If half-depression switch S1 is on, the procedure returns to step S107; if switch S1 is off, the program terminates. If switch S2 is determined in step S107 to be on, focussing motor drive 9 is precisely rotated in step S108. In step S110, it is determined whether the output of switch S3 is at level "L" or at level "H."

As focussing motor 9 moves lens frame 5 from the reset position in the direction of the optic axis (to the left in FIG. 10), the output of switch S3 switches from "H" to "L." The CPU then proceeds to step S111, starting a first timer. In step S112, a driving pulse counter starts. In step S113, it is determined whether the time is up on the timer started in step S111. If the time is not yet up, in step S114 the pulse counter determines whether the pulse number N determined in step S105 has been reached. In steps S113 and S114, if it is determined that the set pulse number N has not been reached within a prescribed time, the procedure moves to step S115. In step S114, if it is determined that the set pulse number N has been reached within a prescribed time, the procedure moves to step S117.

In step S115, focussing motor 9 is driven intermittently, that is, with a pulsed driving action. It is then determined during the pulsed driving action whether the pulse count has reached the set pulse number N, in step S116. If the set pulse number N has been reached, the procedure advances to step S117. If the set pulse number N has not been reached, the procedure returns to step S115 and repeats the intermittent driving action of focussing motor 9.

In step S117, because photographic lens 1 has reached the focus position, the flow of current to focussing motor 9 stops. In step S118, the combination shutter/diaphragm 2 is driven, based on the exposure value determined in step S106, and the film is exposed. In step S119, focussing motor 9 is rotated in the reverse direction to restore photographic lens 1 to the reset position. In step S120, a second timer is started. In steps S121 and S122, it is determined whether the photographic lens has been restored to the reset position (region B) within the prescribed time, by detecting whether the output of switch S3 has returned to "H."

If photographic lens 1 has not returned to the reset position (region B), the procedure advances to step S124, changes to a pulsed driving action, and drives focussing motor 9 intermittently. In step S125, it is determined whether photographic lens 1 has returned to the reset position. If it has returned, the procedure moves to step S123 and stops the flow of current to focussing motor 9. Subsequently, the film is advanced one frame in step S126 and the first and second timers are reset in step 127, and the program ends.

Through the operation described above, because focussing motor 9 switches to an intermittent driving action when, for example, the photographer accidentally stops the movement of photographic lens 1 suring focussing movement or return movement, there is no danger of current overheating focussing motor 9. Photographic lens 1 can continue to move if the external force is removed, however; thus focussing movement and return movement still are possible.

With this embodiment, it is possible to directly change the power supply voltage of the current to focussing motor 9 when focussing motor 9 is moving frame 5. It also is possible to move frame 5 intermittently, that is, with a pulsed driving action, at a set speed that has no relation to changes in the power supply voltage. However, it is preferable to intermittently drive frame 5 during abnormal circumstances at a speed slower than the set speed.

Also, with the present embodiment, switch S3, photo-interrupter 7, and rotating plate 8 are used to detect the position of lens frame 5. If the absolute position of lens frame 5 can be determined by the combination of photo-interrupter 7 and rotating plate 8, however, switch S3 may be omitted.

Furthermore, with the present embodiment, a case where photographic lens 1 is moved for focussing was described as an example. However, the present invention also applies to cases in which photographic lens 1 is moved for zooming.

As described above, according to this embodiment, the lens barrel can continue to move, even when it does not reach a set position within a prescribed time interval when touched accidentally by the photographer, as soon as the photographer stops touching the leans barrel. Thus, operability is improved, and overheating of the motor is prevented.

Figure 12:
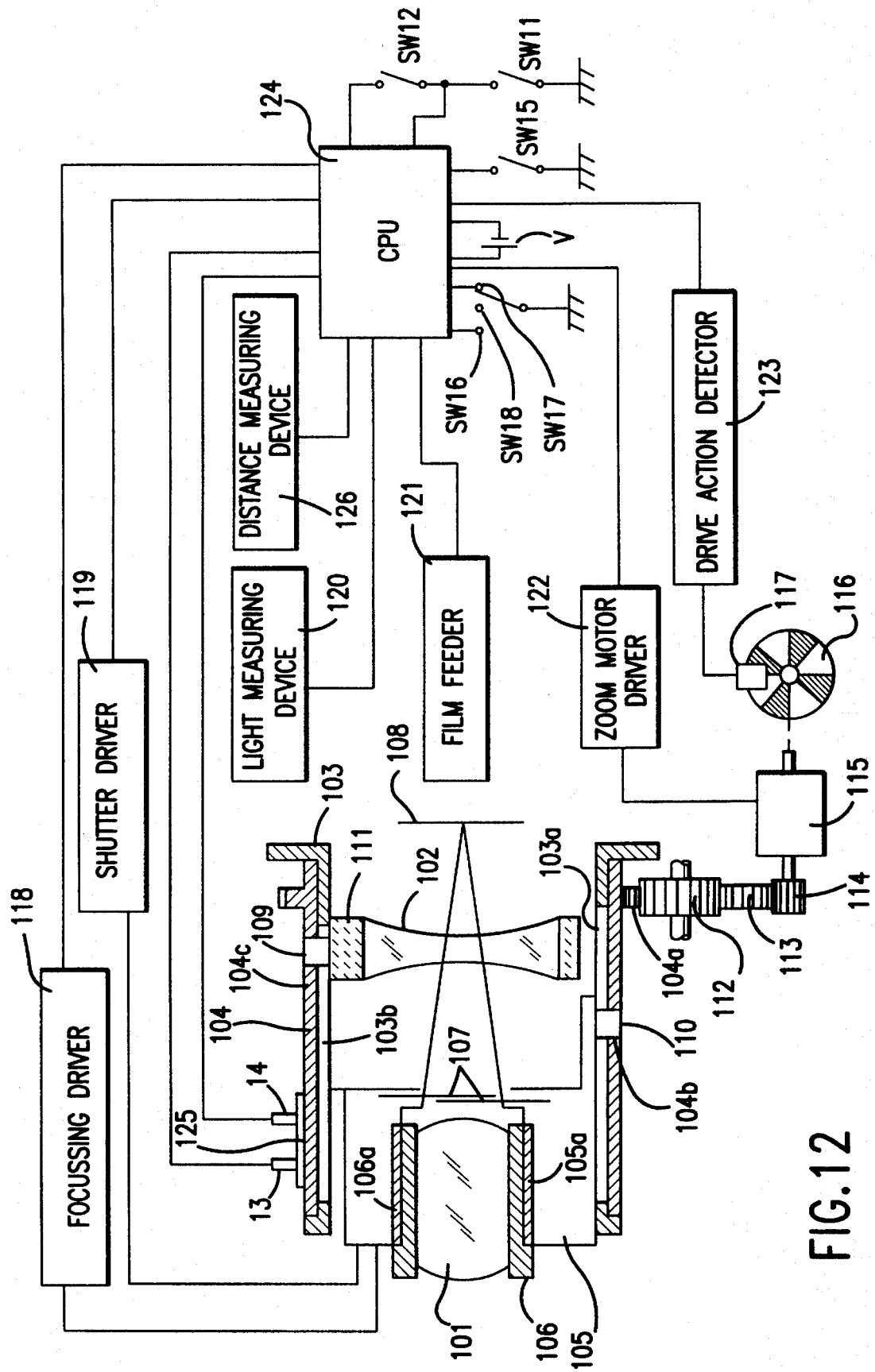
FIG. 12 is a block diagram of a camera according to an alternative embodiment.

Turning to the FIG. 12 embodiment, a camera is equipped with a zoom lens including an optical system with a variable magnification lens, which also carries out focussing. The camera also includes a drive motor that moves the optical system, and a device for regulating the drive motor.

In FIG. 1, lens 10 carries out both magnification variation and focussing and is held in lens holding tube 106. Lens holding tube 106 is equipped with a male threaded portion 106a. Lens barrel 105 is equipped with a female threaded portion 105a, and lens holding tube 106 and lens barrel 105 screw together, lens holding tube 106 being accepted by lens barrel 105. Lens barrel 105 is equipped with a driving component (not shown) that moves combination diaphragm/shutter 107 and lens holding tube 106. Lens barrel 105 fits into cam tube 104, and cam tube 104 fits into fixed tube 103.

Follower pin 110 is affixed to lens barrel 105 and fits into cam hole 104b of cam tube 104 and into linear guide hole 103a of fixed tube 103, which is affixed to the body of the camera (not shown).

Lens 102 is held in lens holding tube 111. Follower pin 109 is affixed to lens holding tube 111 and fits into cam hole 104c of cam tube 104 and into linear guide hole 103b of fixed tube 103. Rotation of cam tube 104 causes lenses 101 and 102 to vary image magnification.

Conductor plate 125 is attached around the outside of cam tube 104 and is used to distinguish the position of lens barrel 105 along the optic axis. Three lens barrel positions are: a housed position, shown in FIG. 13A, a photography-ready position (wide-angle position), shown in FIG. 13B, and a telescoping position, shown in FIG. 13C.

Gear 104a is attached to the outside of cam tube 104 and is coupled to gears 112, 113, and 114. Gear 114 is attached to one end of the drive shaft of motor drive 115. To the other end of the shaft is attached circular plate 116, which has a pattern of alternating transparent and opaque sections. A photo-interrupter 117 detects the pattern on circular plate 116 and is set up near circular plate 116.

CPU 124 is connected to focussing action driver 118, shutter action driver 119, light measuring (photometry) device 120, distance measuring device 126, film feeder 121, zoom motor driver 122, and driving action detector 123, and regulates each unit. CPU 124 also is connected to battery V, brush 13, brush 14, and switches SW11–SW12 and SW15–SW18.

The FIG. 12 camera performs basic actions, such as zooming, light measurement, distance measurement, focussing driving action, shutter action, and film feeding. Each of these basic actions is executed by a command from CPU 124. CPU 124 also directs a starting operation when switch SW15 is turned on. The action at the time of starting is described in detail below.

First, the photographer aims the camera at the object to be photographed and varies the magnification as desired. If a zoom-in action, which produces a high degree of magnification by telescoping lens barrel 105 out, is desired, switch SW16 is turned on. If a zoom-out action, which produces a low degree of magnification by retracting lens barrel 105 in, is desired, switch SW17 is turned on. When switch SW16 or SW17 is turned on, CPU 124 sends a rotating command through zoom motor driver 122 to drive motor 115, and drive motor 115 rotates accordingly. Motor 115 rotates gear 114, attached to the drive shaft of drive motor 115, and cam tube 104 is rotated by gears 113 and 112. When cam tube 104 rotates, lens barrel 105, which contains lens 101, and lens holding tube 111, which holds lens 102, move in the direction of the optic axis and magnification is varied. When a desired magnification is reached, i.e., when the magnification varying action is finished, zoom switch SW18 is switched to ON and the degree of magnification is set.

Driving action detector 123 detects the rotation of circular plate 116, which is attached to one end of the drive shaft of drive motor 115, during variation of magnification. At this point, photo-interrupter 117 sends a generated pulse signal to CPU 124.

After the photographer determines the desired degree of magnification, light measuring device 120 measures the amount of light from the object, on command from CPU 124 when half-depression switch SW11 is turned on. Distance measuring device 126 measures the distance to the object. CPU 124 then sends a command to focussing action driver 118, based on the signal of light measuring device 126, and lens 101 is moved in the direction of the optic axis by a driving component (not shown) installed inside lens barrel 105. The image of the object being photographed thus is brought into focus on the film.

After light measurement, distance measurement and focussing are completed, as described above, and after the photographer turns on full-depression switch SW12, combination diaphragm/shutter 107 is driven by shutter action driver 119 on command from CPU 124. Film 108 thus is exposed. When exposure is complete, film feeder 121, on command from CPU 124, advances the film.

A lens position distinguishing arrangement will now be described, with reference to FIGS. 12 and 13A–13C.

As stated above, conductor plate 125 is attached around the outside of cam tube 104. When cam tube 104 rotates, brushes 13 and 14 rub against patterns 125a and 125b of conductor plate 125, and CPU 124, through signals from brushes 13 and 14, distinguishes the position of lens barrel 105. CPU 124 thus can distinguish the housed position, shown in FIG. 13A, the photography-ready position (wide-angle position), shown in FIG. 13B, or the telescoping position, shown in FIG. 13C. The distinguishing arrangement described above uses a combination of H (High) and L (Low) signals from brushes 13 and 14. For the housed position, shown in FIG. 13A, brush 13 issues an H signal and brush 14 also issues an H signal. For the photography-ready position (wide-angle position), shown in FIG. 13B, brush 13 issues an L signal and brush 14 also issues an L signal. For the telescoping position, shown in FIG. 13C, brush 13 issues an H signal and brush 14 issues an L signal.

Figure 14:
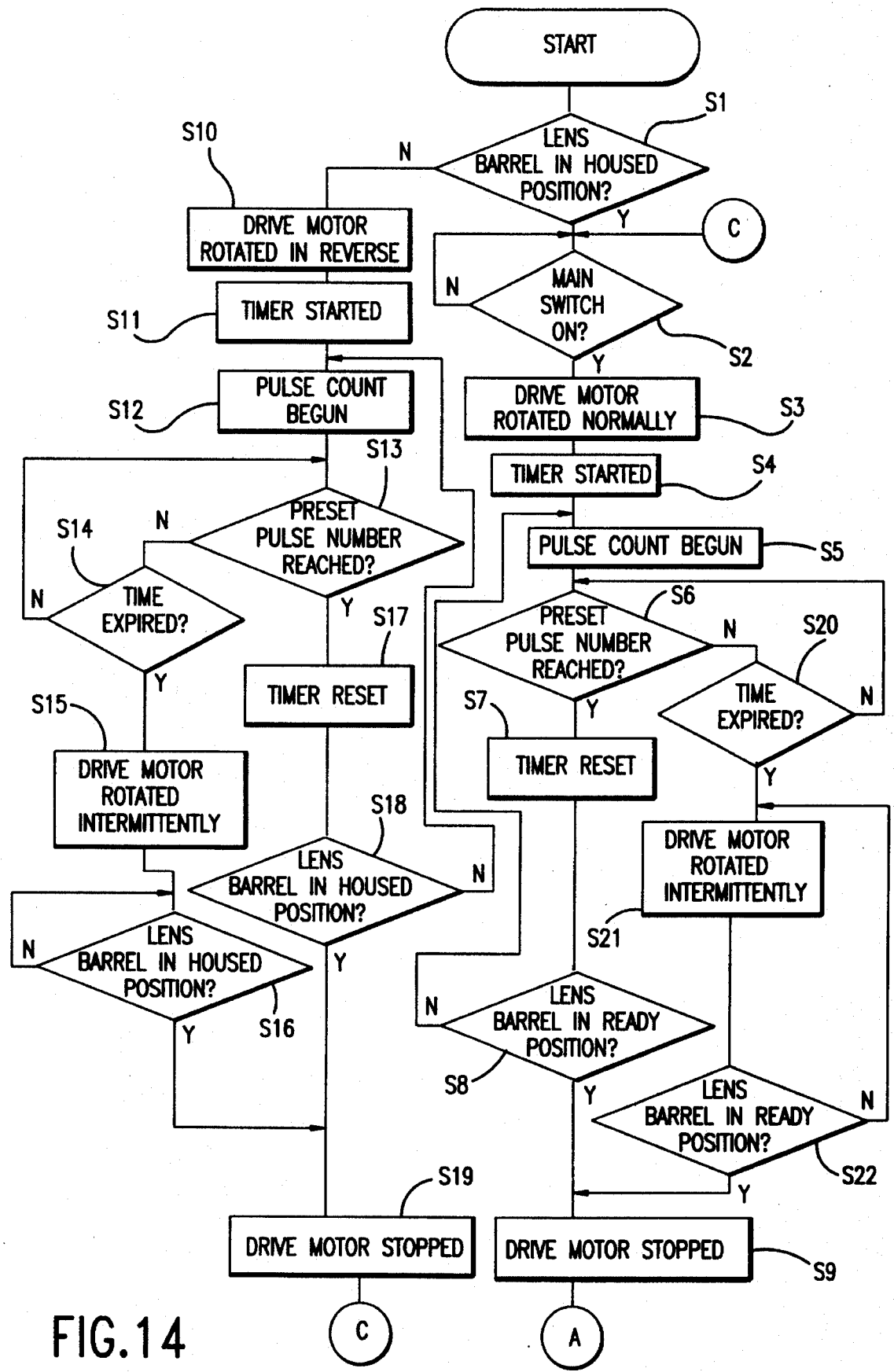
FIG. 14 is a flow chart showing a pre-photographic process of the FIG. 12 camera.
Figure 15:
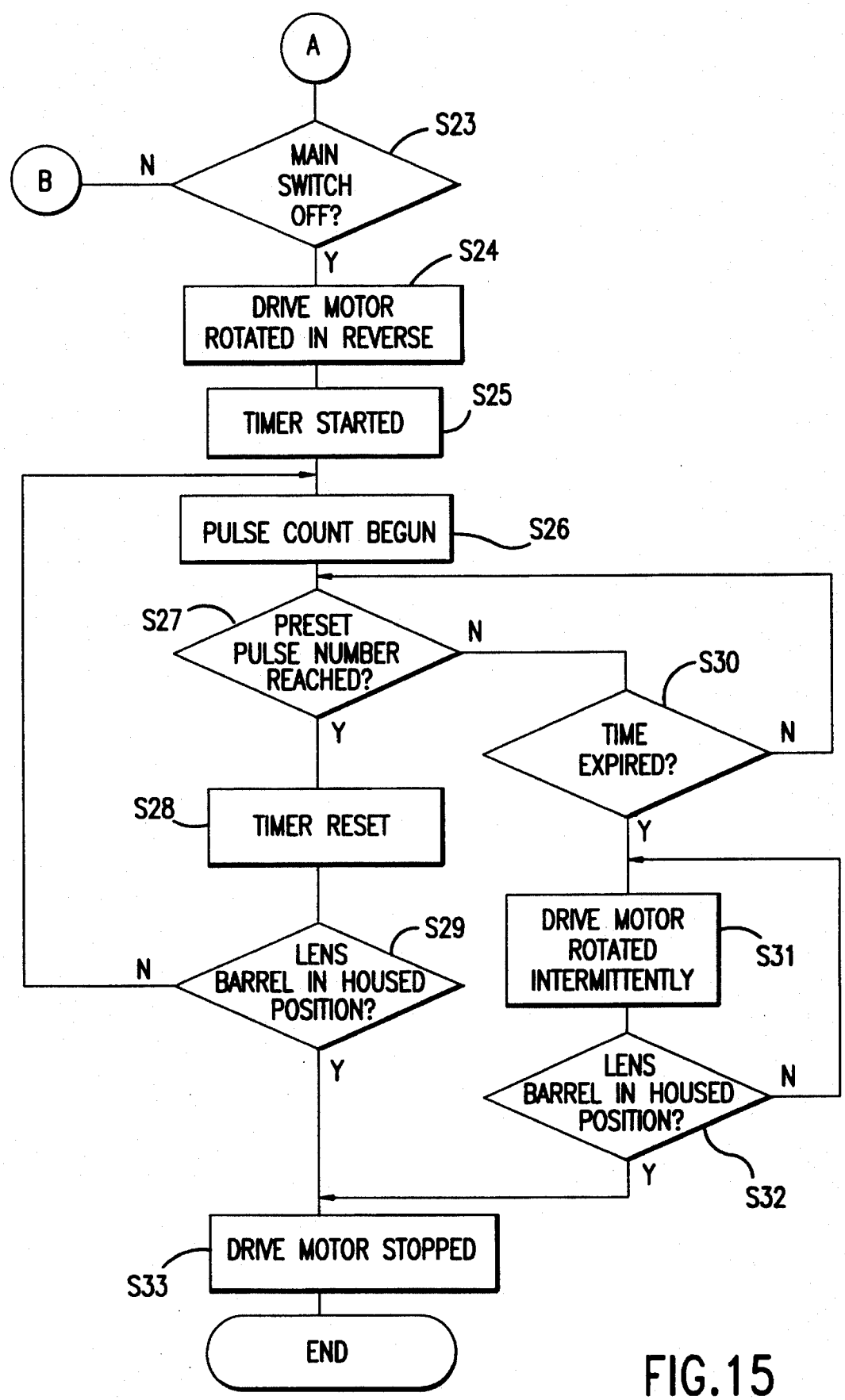
FIG. 15 is a flow chart showing a post-photographic process of the FIG. 12 camera.
Figure 16:
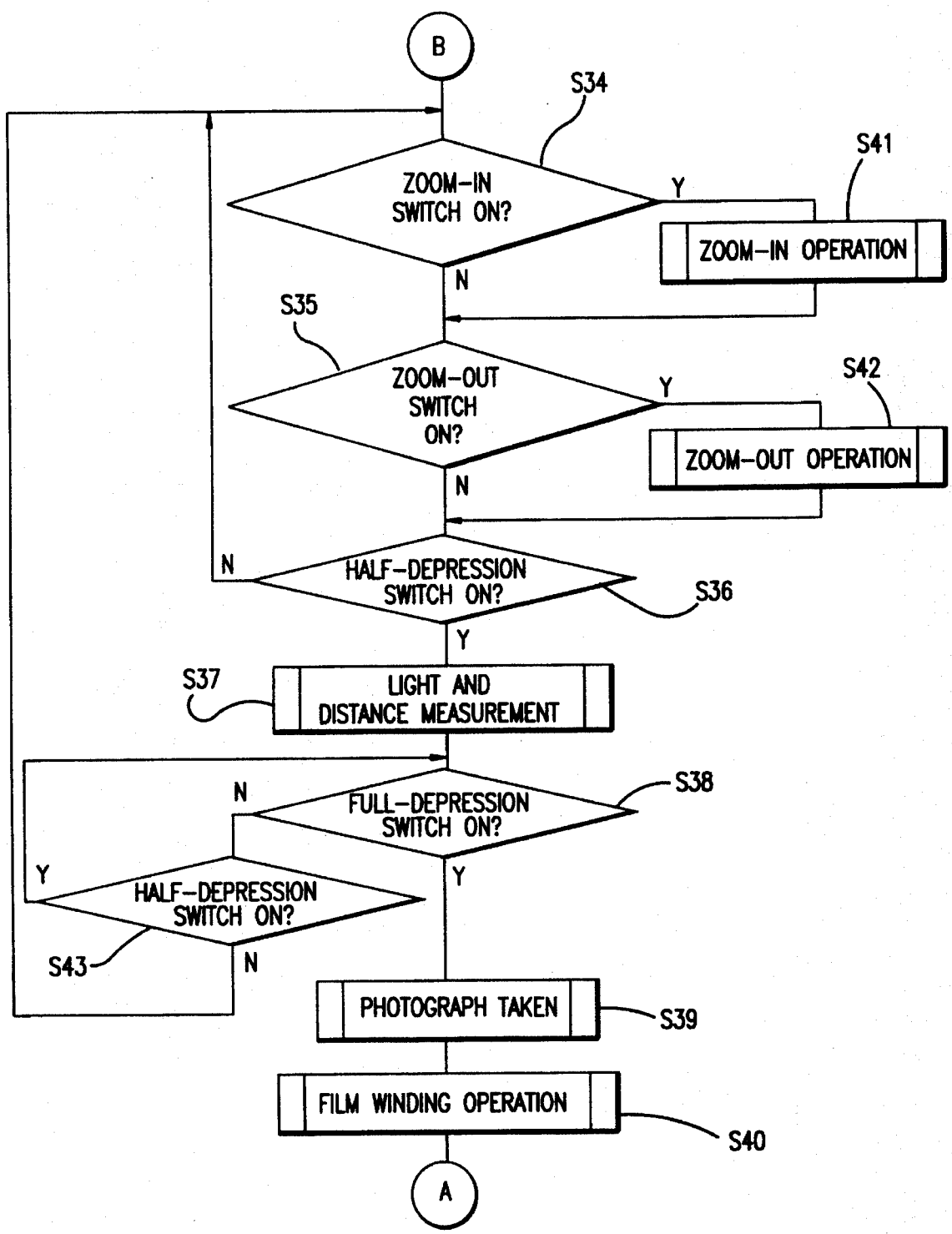
FIG. 16 is a flow chart showing a photographic process of the FIG. 12 camera.
Figure 17:
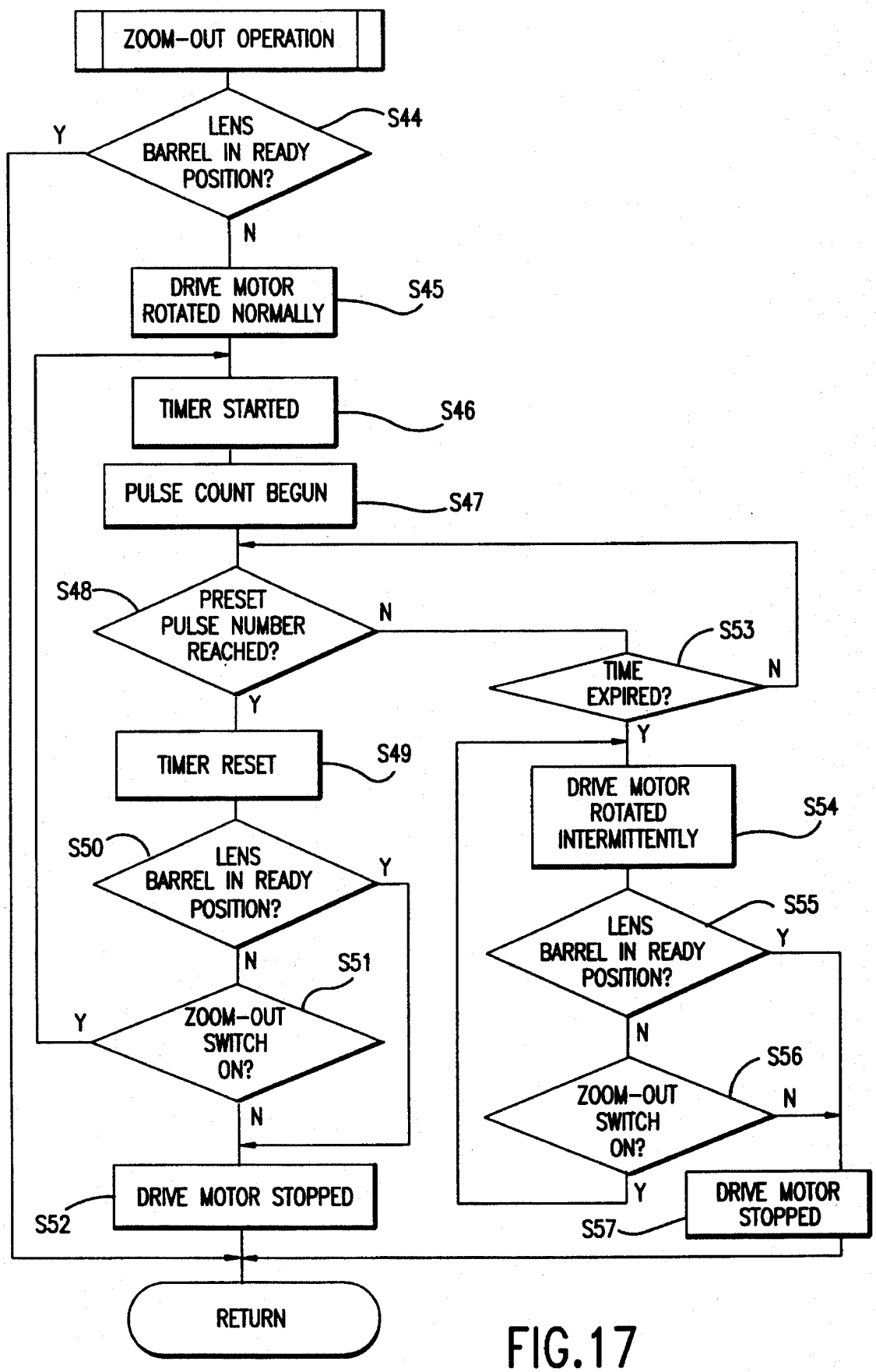
FIG. 17 is a flow chart showing a zoom-out process of the FIG. 12 camera.
Figure 18:
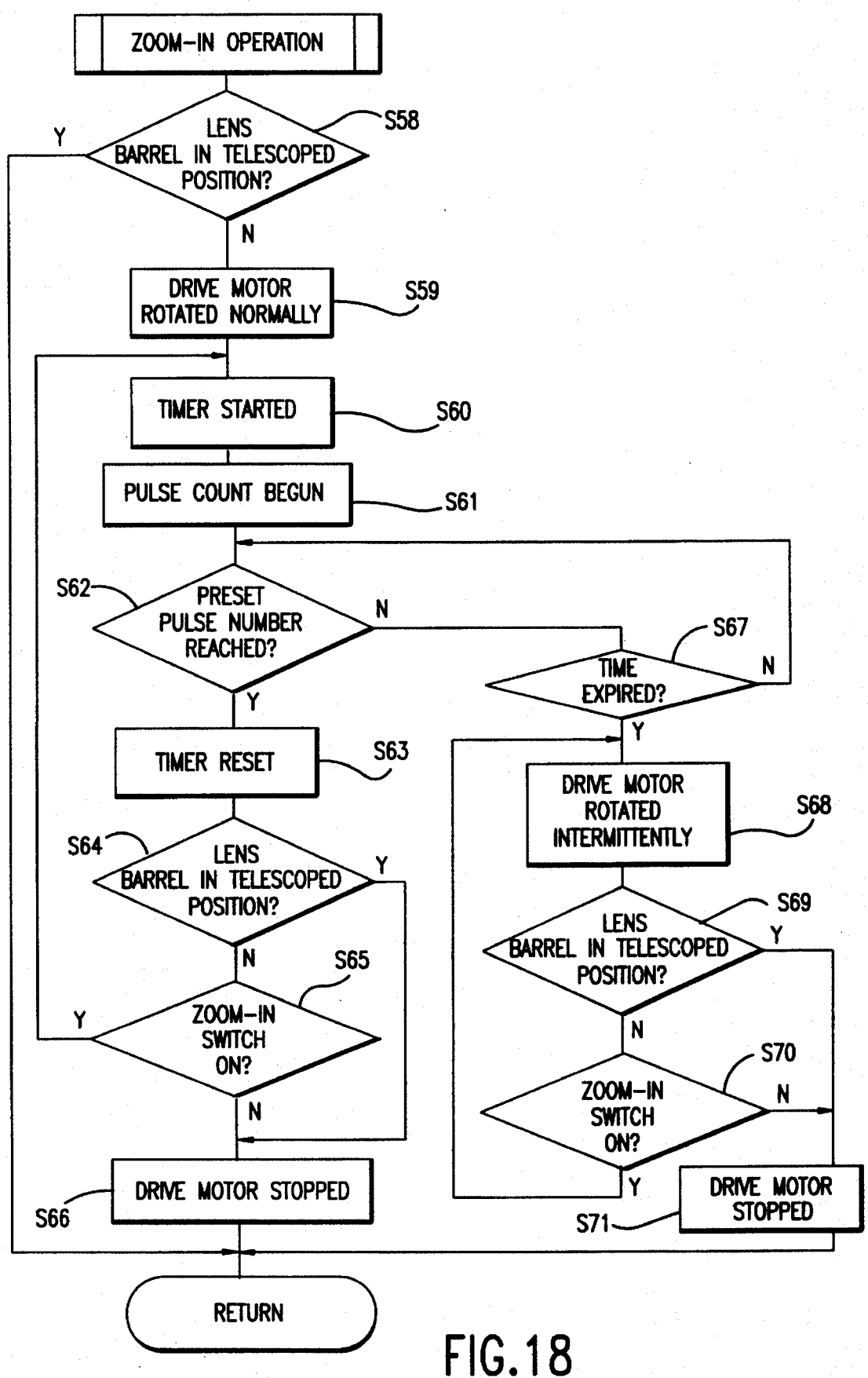
FIG. 18 is a flow chart showing a zoom-in process of the FIG. 12 camera.

The operation 1 of the FIG. 12 camera is described hereafter, with reference to FIGS. 14–18. FIGS. 14–15 show the sequence of operations from a photography-ready state to a photography-completed state. FIG. 16 shows operation at the time of photography. FIG. 17 shows the process of step S42 of FIG. 16. FIG. 18 shows the process of step S41 of FIG. 16.

The camera's photography-ready process now will be described, with reference to FIG. 14. First, steps S1–S9 will be described. In step S1, once a battery is loaded in the camera body, CPU 124 determines by signals from brushes 13 and 14 whether lens barrel 105 is in the housed position. If lens barrel 105 is in the housed position (FIG. 13A), the procedure waits in step S2 for main switch SW15 to be turned on. When main switch SW15 is turned on, drive motor 115 is rotated normally in step S3. After drive motor 115 has rotated, a driving action confirmation is performed using a timer, in steps S4–S7. In step S4, the timer is started. In step S5, when circular plate 116 attached to drive motor 115 is turned, CPU 124 starts a pulse count of the pulses generated by photo-interrupter 117, which is positioned near circular plate 116. In step S6, CPU 124 determines whether the preset pulse count has been reached. If CPU 124 determines that the pulse count has been reached, the timer is reset in step S7. If CPU 124 determines that lens barrel 105 has stopped at the photography-ready position (FIG. 13B) in step S8, drive motor 115 is stopped in step S9 and the movement of lens barrel 105 from the housed position to the photography-ready position has been completed normally.

The case in which CPU 124 determines that the pulse count has not been reached normally in step S6 now will be explained, with reference to steps S20–S22 and step S9. In step S20, if CPU 124 determines that the pulse has not been generated within a prescribed time interval (referred to below as "time up"), drive motor 115 is switched to an intermittent driving action in step S21. In step S22, if CPU 124 is able to determine that lens barrel 105 has been able to move to the photography-ready position, drive motor 115 is stopped in step S9.

A case in which lens barrel 105 is not in the housed position (FIG. 13A) when the battery is loaded in the camera body will be described hereafter, with reference to steps S10–S19. If CPU 124 determines in step S1 that lens barrel 105 is not in the housed position, drive motor 115 is rotated in reverse in step S10. In steps S11–S17, a driving action confirmation is performed, using a timer. Because the driving action confirmation process is the same as in steps S4–S7, description of it is omitted. In step S18, if CPU 124 determines that lens barrel 105 has reached the housed position, drive motor 115 is stopped in step S19.

The case in which the pulse count is not performed normally in step S13 will be described hereafter, with reference to steps S4–S16 and S19. If the time is up in step S14, drive motor 115 is switched to an intermittent driving action in step S15. In step S16, if it is confirmed that lens barrel 105 has reached the housed position, drive motor 115 is stopped in step S19.

A post-photography process now will be described, with reference to steps S23–S33 of FIG. 15. When the photographer finishes photographing and CPU 124 determines that main switch SW15 is off, drive motor 115 is rotated in reverse in step S24. When drive motor 115 rotates, a driving action confirmation process is performed in steps S25–S28, in the same manner as in the pre-photography process of FIG. 14. Because the driving action confirmation process is the same as in steps S4–S7, description of it is omitted. In step S24, drive motor 115 is rotated in reverse, and if CPU 124 determines that lens barrel 105 has reached the housed position (FIG. 13A) without hindrance, drive motor 115 is stopped and the process is finished.

If the pulse count in step S27 cannot be completed normally, steps S30–S32 carry out the same operation as steps S14–S16 of FIG. 14. Hence, description of it is omitted here.

A photographic operation now will be described, with reference to steps S34–S43 of FIG. 16. If CPU 124 determines in step S23 of FIG. 15 that main switch SW15 is on, the procedure advances to step S34. If CPU 124 determines in step S34 that zoom-in switch SW16 is on, a zoom-in operation is performed in step S41. Likewise, if CPU 124 determines in step S35 that a zoom-out switch SW17 is on, a zoom-out operation is performed in step S42. If CPU 124 determines in step S36 that release button half-depression switch SW11 is on, the procedure advances to step S37 and performs light and distance measurement. In step S38, if CPU 124 determines that release button full-depression switch SW12 is on, a photographing operation is executed in step S39, after which a film advancing operation is performed in step S40. The camera then returns to the state shown in FIG. 13A.

FIG. 17 illustrates the zoom-out operation of step S42. The zoom-out operation commences when zoom-out switch SW17 is on. The normal operation of the zoom-out process will be described hereafter, with reference to steps S44–S52.

If CPU 124 determines in step S44 that lens barrel 105 is not in the photography-ready position, drive motor 115 is rotated in reverse in step S45. In steps S46–S49, a driving action confirmation is performed, using a timer. Steps S46–S49 are the same as steps S4–S7 of FIG. 14; hence a description of those steps is omitted. If CPU 124 determines in step S50 that lens barrel 105 is not at the photography-ready position, the procedure advances to step S51. In step S51, it is determined whether switch SW17 is on. If switch SW17 is on, driving action confirmation steps S46–S49 are performed. If CPU 124 determines in step S50 that lens barrel 105 is at the photography-ready position, drive motor 115 is stopped in step S52. Obviously, if lens barrel 105 is at the photography-ready position in step S44, the zoom-out operation is not performed.

Next, the condition in which the zoom-out process is not performed normally will be described, with reference to steps S53–S57.

First, steps S53–S57 will be summarized and described. If some type of external force is applied to lens barrel 105 while the photographer is executing the zoom-out process, drive motor 115 switches to an intermittent driving action. If lens barrel 105 reaches the photography-ready position during the intermittent driving action, or if zoom switch SW18 is turned ON during the intermittent driving action, the mechanism stops the current to the drive motor. The zoom-in process operates similarly.

If CPU 124 determines in step S53 that time is up, drive motor 115 performs an intermittent driving action in step S54. If CPU 124 determines in step S55 that lens barrel 105 is not at the photography-ready position and turns zoom-out switch SW17 on intermittently in step S56, the procedure returns to step S54. If CPU 124 determines in step S55 that lens barrel 105 is at the photography-ready position, the intermittent driving action of drive motor 115 is stopped in step S57. Even when CPU 124 determines in step S56 that zoom-out switch SW17 is on, the intermittent driving action of drive motor 115 still is stopped in step S57.

Thus, in steps S53–S57, operability is improved so that even if the photographer accidentally touches lens barrel 105 and lens barrel 105 does not move within a prescribed time interval, drive motor 115 will resume its driving action if the photographer stops touching the lens barrel.

During the intermittent driving action of the drive motor 115, if zoom switch SW18 is turned on forcefully, the intermittent driving action is stopped and any unnecessary load on drive motor 115 is alleviated. Thus, overheating of drive motor 115 may be prevented.

FIG. 18 illustrates the zoom-in operation of step S41. The zoom-in operation of FIG. 18 is similar to the zoom-out operation of FIG. 17, but includes certain changes. In contrast to steps S44, S50, and S55 of FIG. 17, which determine if lens barrel 105 is in the photography-ready position, steps S58, S64, and S69 of FIG. 18 determine if lens barrel 105 is in the telescoping position. Further, in contrast to step S45 of FIG. 17, in which reverse rotation occurs, in step S59 of FIG. 18 the rotation is normal.

Driving action confirmation steps S60–S63 are the same as steps S46–S49 of FIG. 17, and steps S67–S71, which deal with the situation in which the zoom-in is not performed normally, are the same as steps S53–S57 of FIG. 17. Hence, their description is omitted.

Figure 19:
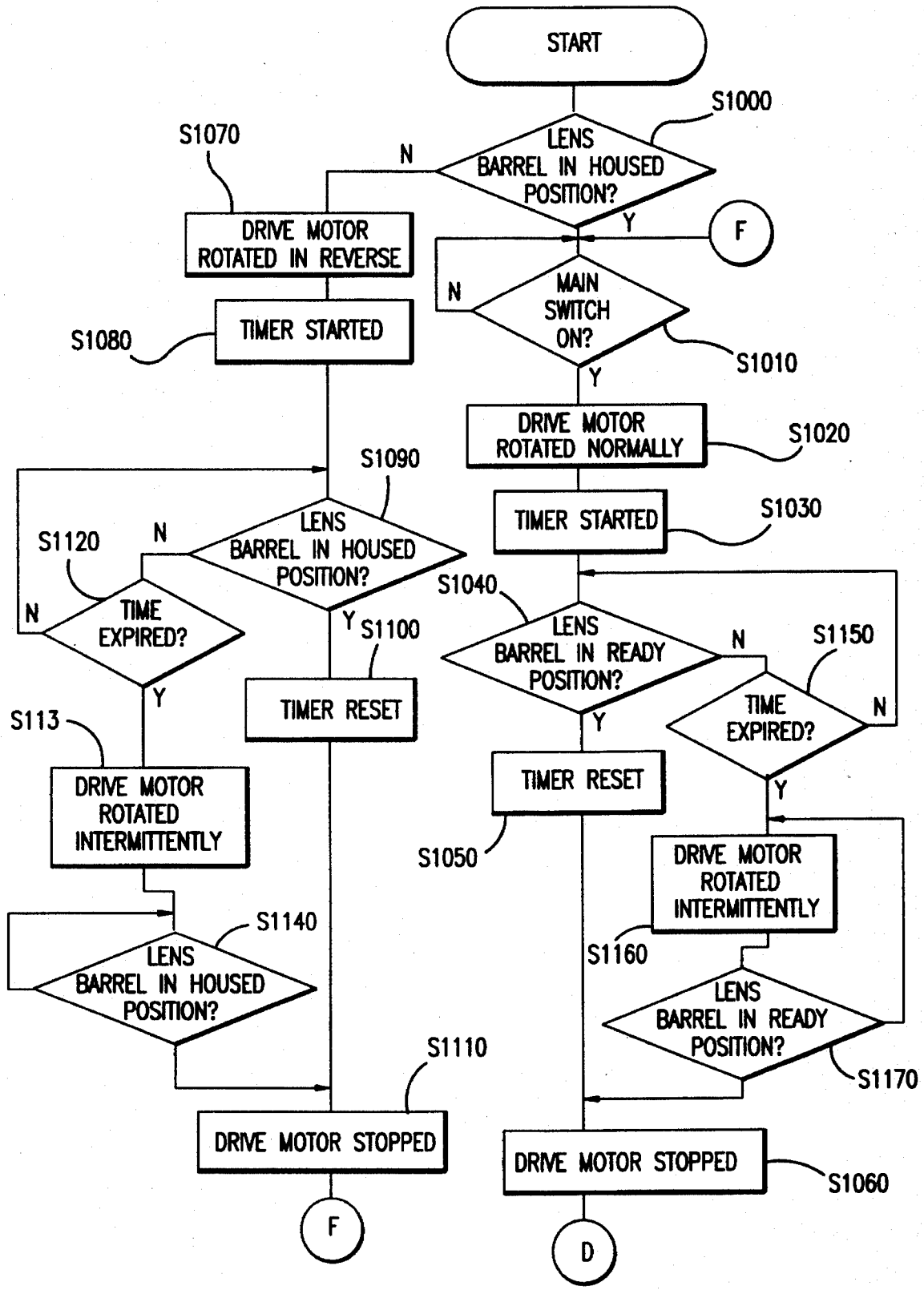
FIG. 19 is a flow chart showing an alternative pre-photographic process of the FIG. 12 camera.
Figure 20:
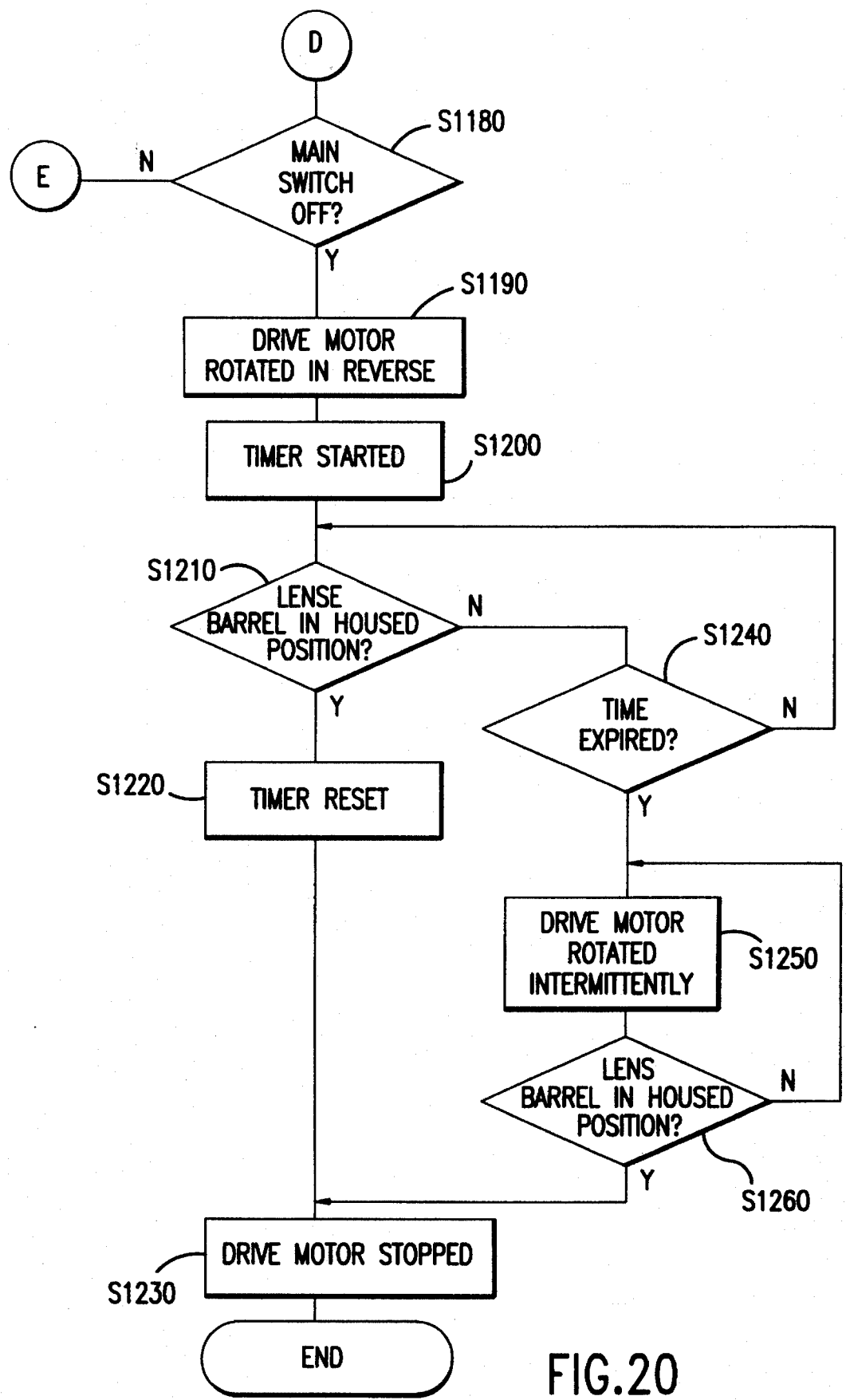
FIG. 20 is a flow chart showing an alternative post-photographic process of the FIG. 12 camera.
Figure 21:
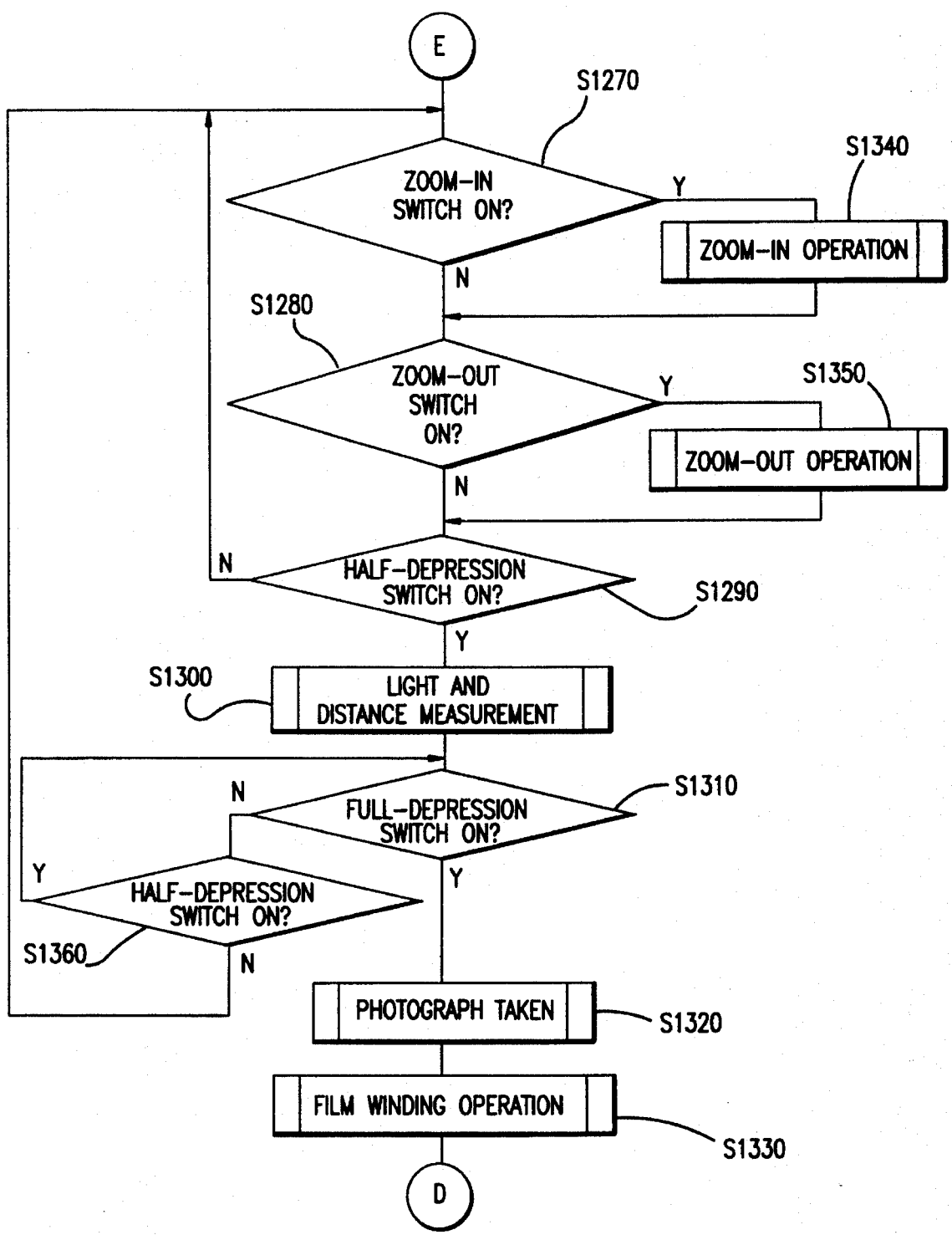
FIG. 21 is a flow chart showing an alternative photographic process of the FIG. 12 camera.
Figure 22:
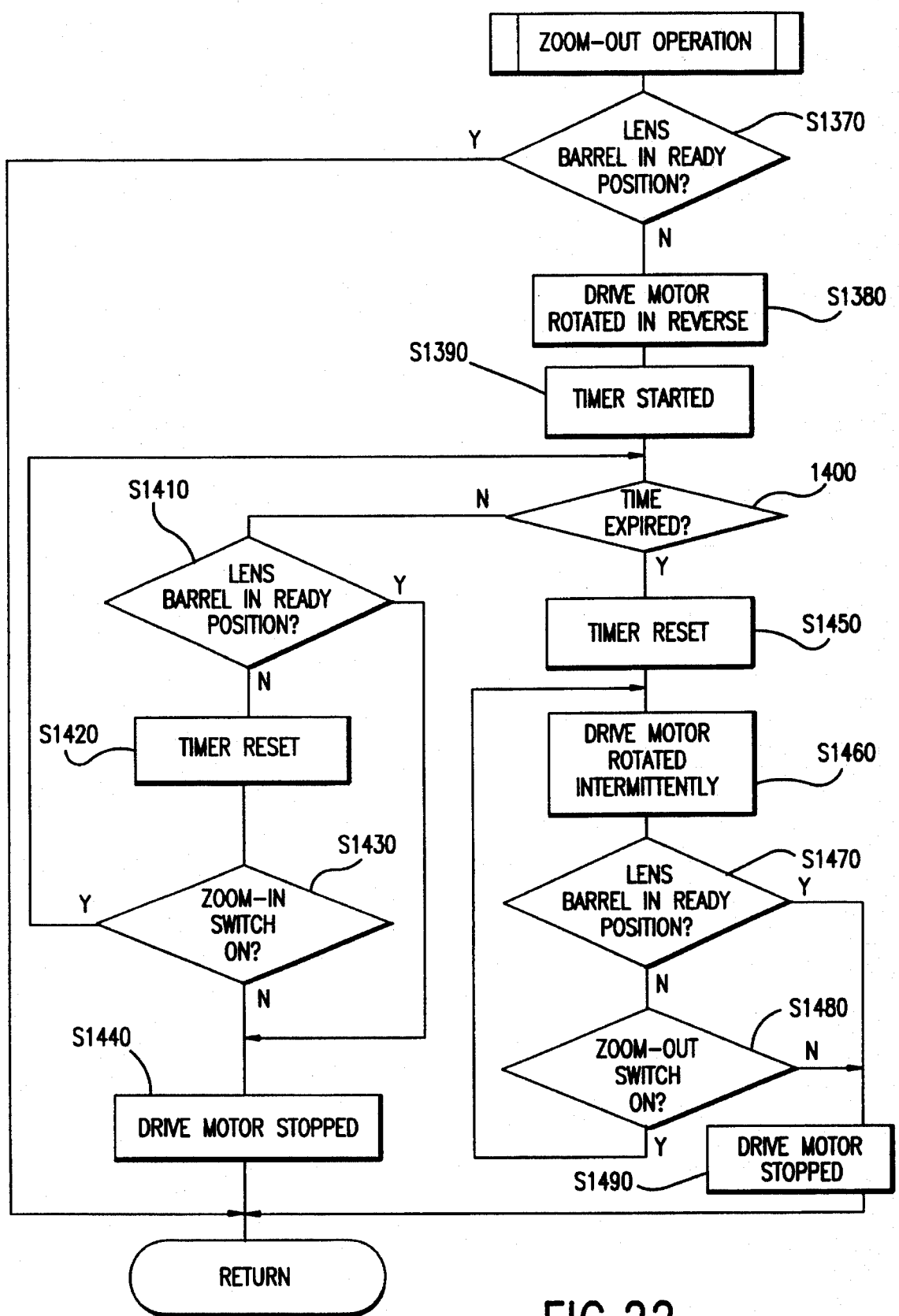
FIG. 22 is a flow chart showing an alternative zoom-out process of the FIG. 12 camera.

FIGS. 19 and 20 show alternative processes for the FIG. 12 camera. FIG. 21 shows operation at the time of photography. FIG. 22 shows the process of step S135 of FIG. 21. FIG. 12 shows the process of step S134 of FIG. 21. The alternative sequences are similar to the previously described sequences, but include certain differences. One difference between the alternative sequences is that the driving action confirmation process uses a timer.

Figure 13A:
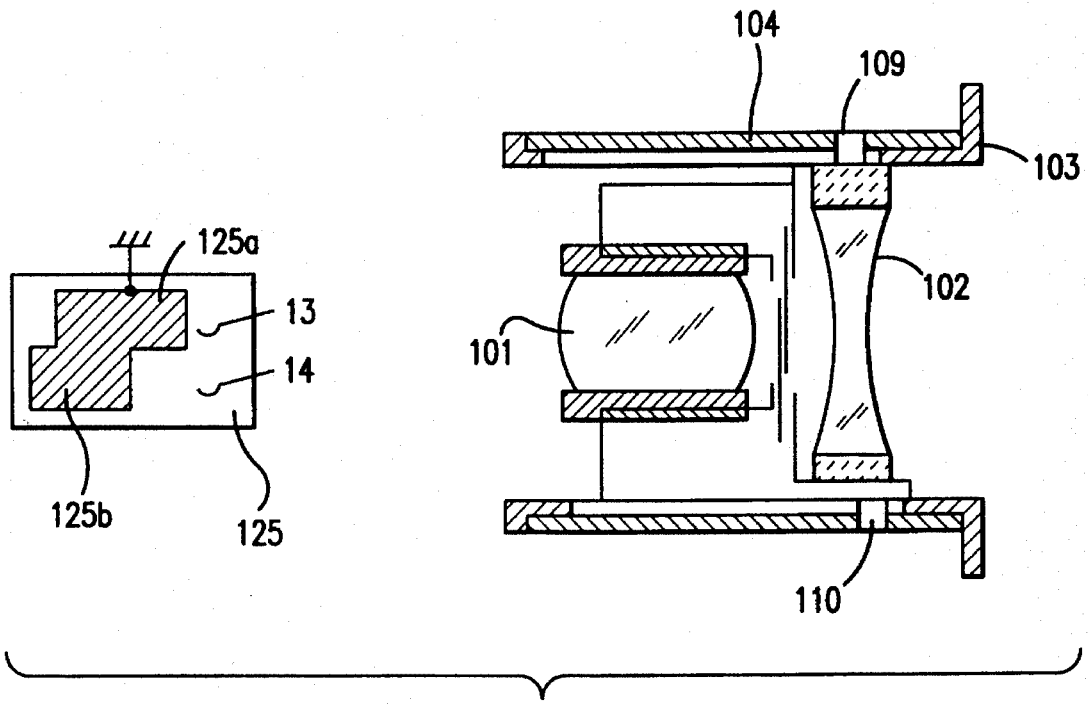
FIGS. 13A–13C show a zoom lens barrel position detection arrangement of the FIG. 12 camera.
Figure 13B:
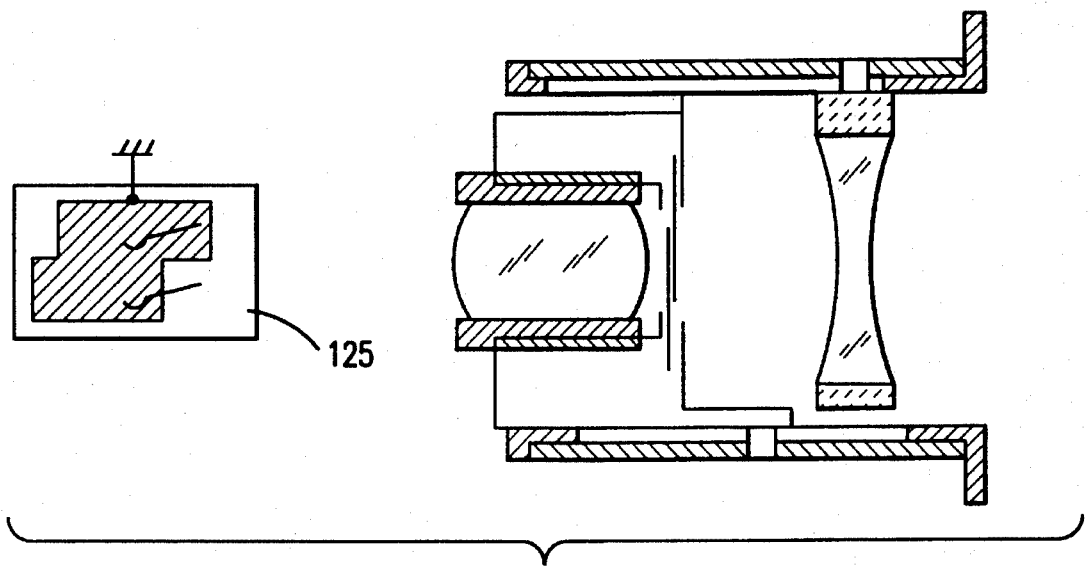
Figure 13C:
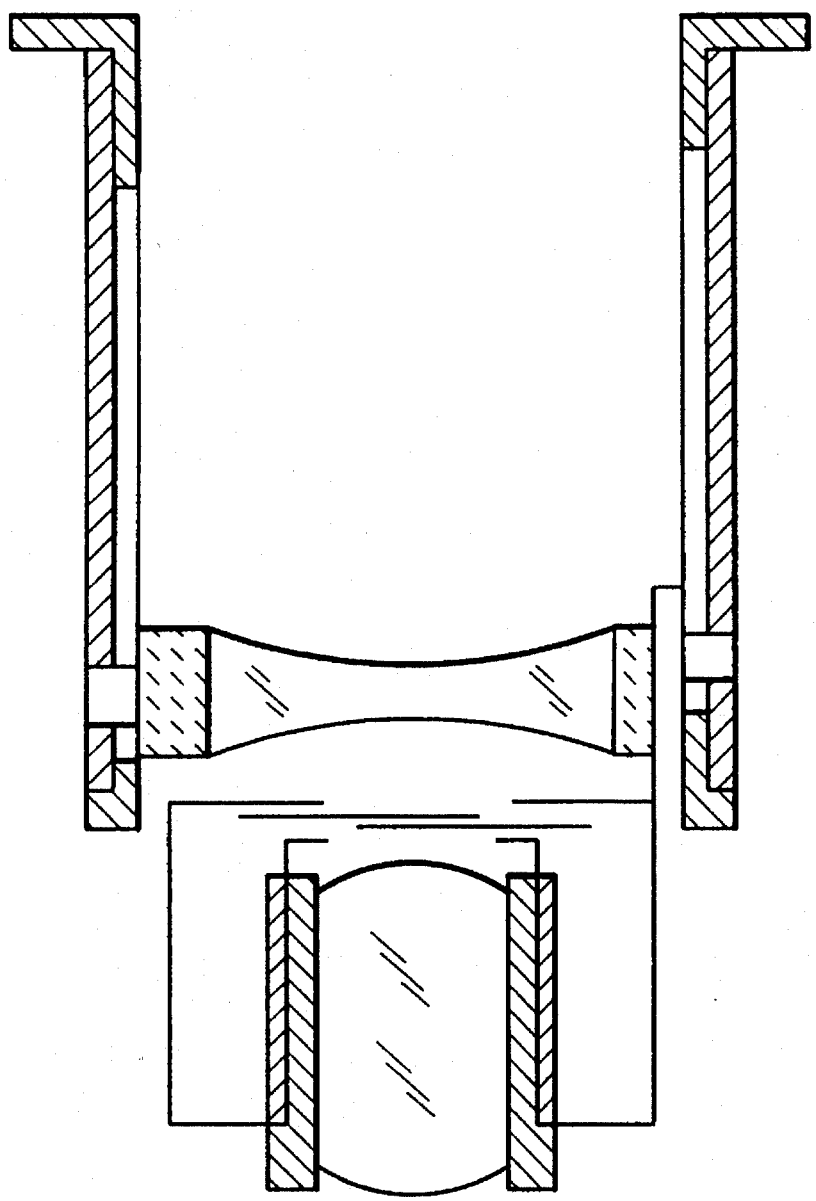
Figure 13C:
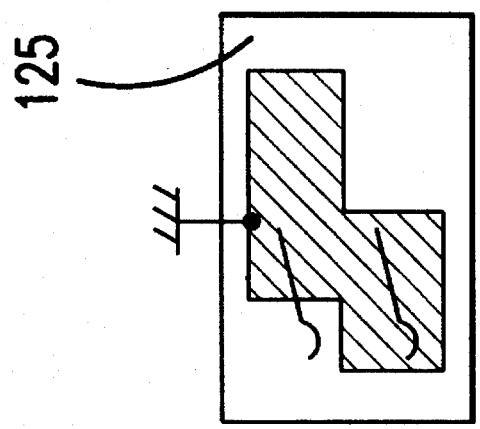

First, the process of FIG. 19 will be described. When a battery is in the camera body, in step S1000 CPU 124 determines through signals from brushes 13 and 14 whether lens barrel 105 is in the housed position (FIG. 13A). If lens barrel 105 is in the housed position, the procedure waits for main switch SW15 to be turned on in step S1010. When main switch SW15 is turned on, drive motor 115 is rotated normally in step S1020. In step S1030, the timer is started, and if CPU 124 determines in step S1040 that lens barrel 105 has reached the photography-ready position within the prescribed time interval, the timer is reset in step S1050. Then, in step S1060, drive motor 115 is stopped.

Steps S1150–S1170 are the same as steps S20–S22 of FIG. 14 and will not be described further.

The case in which lens barrel 105 is not in the housed position (FIG. 13A) when a battery is in the camera body now will be described, with reference to steps S1070–S1110.

If CPU 124 determines in step S1000 that lens barrel 105 is not in the housed position, drive motor 115 is rotated in reverse in step S1070. In step S1080 the timer is started, and if CPU 124 determines in step S1090 that lens barrel 105 has reached the housed position within the prescribed time interval, the timer is reset in step S1100. Then, in step S1110, drive motor 115 is stopped.

If CPU 124 determines in step 1090 that lens barrel 105 is not in the housed position, the procedure advances to step S1120. Steps S1120–S1140 are the same as steps S14–S16 of FIG. 14, and will not be described further.

As described above, the sequence of FIG. 19 differs from the driving action regulation process of FIG. 14, which uses a timer. CPU 124 does not perform a pulse count, and the timer is reset after CPU 124 determines that lens barrel 105 is in the photography-ready position or in the housed position. Thus, according to the FIG. 14 embodiment, if drive motor 115 stops for some abnormal reason after it has started, the timer is started, and the process detects an abnormality if the prescribed time interval is exceeded. According to the FIG. 19 embodiment, the timer starts directly after the driving action starts, and the process detects an abnormality if the prescribed time interval is exceeded.

The post-photography process now will be described, with reference to steps S1180–S1230 of FIG. 20.

When photography is finished and CPU 124 determines in step S1180 that main switch SW15 is OFF, drive motor 115 is rotated in reverse in step S1190. When drive motor 115 rotates, driving action confirmation using a timer is performed in steps S1200–S1220, in the same way as in steps S108–S110 of FIG. 19. In step S1190, drive motor 115 rotates in reverse, and if CPU 124 determines in step S1210 that lens barrel 105 has reached the housed position without hindrance, drive motor 115 is stopped in step S1230, and the post-photography process is finished. If lens barrel 105 cannot reach the housed position in step S1210, steps S1240–S1260 perform the same actions as steps S115–S117 of FIG. 19.

FIG. 21 parallels FIG. 16 and will not be described further.

FIG. 22 shows the zoom-out operation of step S1350 of FIG. 21. The beginning of FIG. 22 shows commencement of the zoom-out operation when zoom-out switch SW17 is in the on condition. The normal operation of the zoom-out process will be described hereafter, with reference to steps S1370–S1440.

If CPU 124 determines in step S1370 that lens barrel 105 is not in the photography-ready position, drive motor 115 is rotated in reverse in step S1380. Drive action confirmation using a timer then occurs in steps S1390–S1420. The timer is started in step S1390. If CPU 124 determines in step S1400 that time is not up, the procedure advances to step S1410. If it is determined in Step S1410 that lens barrel 105 is not in the photography-ready position, the timer is reset in step S1420 and the procedure advances to step S1430. If switch SW17 is ON in step S1430, CPU 124 once again determines in step S1400 whether the time is up. If CPU 124 determines in step S1410 that lens barrel 105 is in the photography-ready position, drive motor 115 is stopped in step S1440. If lens barrel 105 is in the photography-ready position at the time of zooming-out in step S1370, the zoom-out process is not performed.

If CPU 124 determines in step S1400 that time is up, the timer is reset in step S1450, and drive motor 115 performs an intermittent driving action in step S1460. If CPU 124 determines in step S1470 that lens barrel 105 is not in the photography-ready position and turns zoom-out switch SW17 on intermittently in step S1480, the procedure returns to step S1460. If CPU 124 determines in step S1470 that lens barrel 105 is in the photography-ready position, the intermittent driving action of drive motor 115 is stopped in step S1490. Even if CPU 124 determines in step S1480 that zoom-out switch SW17 is on, the intermittent driving action of drive motor 115 is stopped in step S1490.

It follows that, in steps S1400–S1490, as in the previous embodiments, operability is improved so that even if the photographer accidentally touches lens barrel 105 and lens barrel 105 does not move within a prescribed time interval, drive motor 115 will resume its driving action if the photographer stops touching lens barrel 105. During the intermittent driving action of drive motor 115, if zoom switch SW18 is turned on forcefully, the intermittent driving action is stopped and any unnecessary load on drive motor 115 is alleviated. Thus, overheating of drive motor 115 may be prevented.

Figure 23:
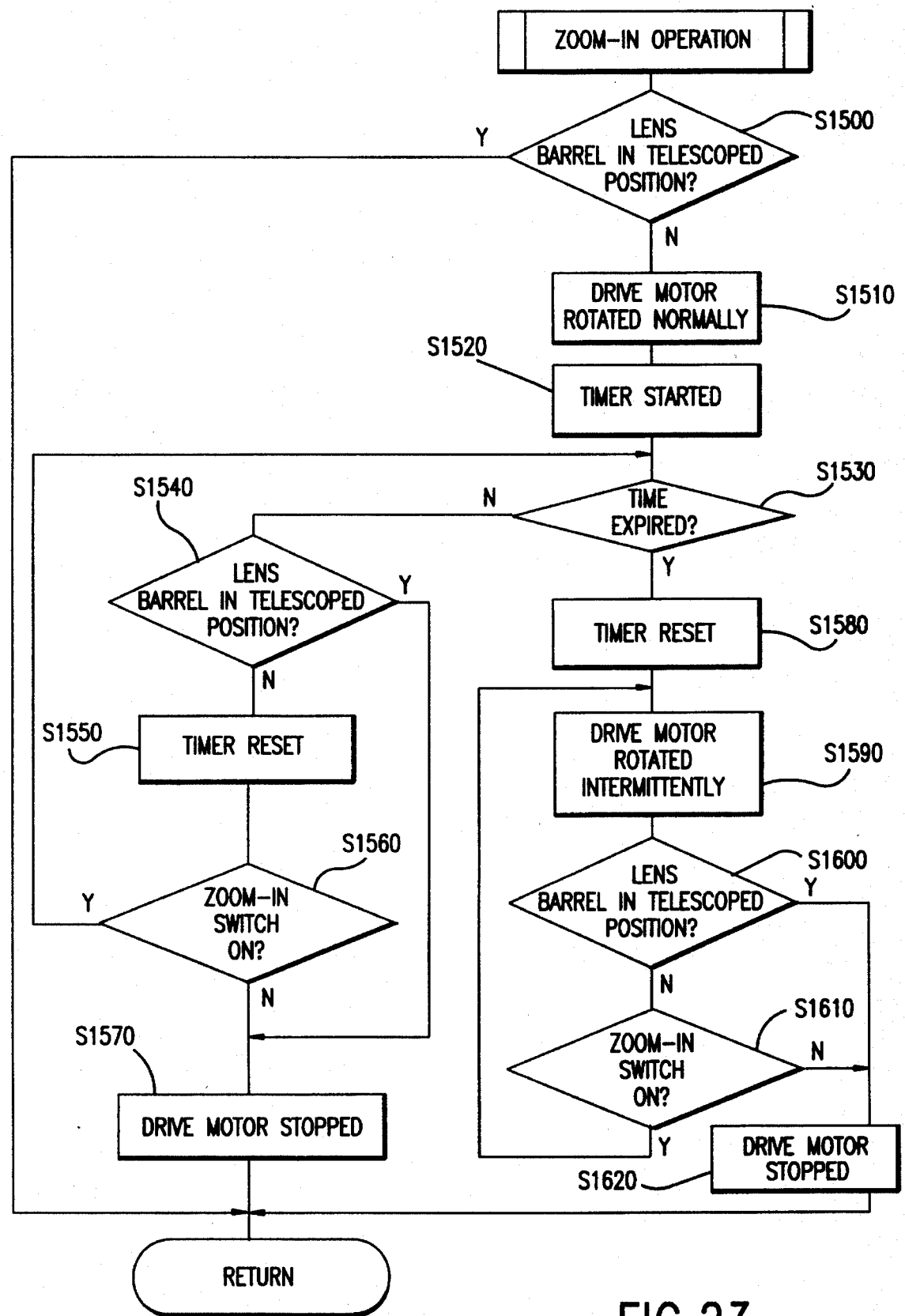
FIG. 23 is a flow chart showing an alternative zoom-in process of the FIG. 12 camera.

FIG. 23 shows the zoom-in operation of step S1340 of FIG. 21. The zoom-in operation of FIG. 23 is similar to the zoom-out operation of FIG. 22, but includes certain differences. In contrast to steps S1370, S1410, and S1470 of FIG. 22, in which it is determined whether lens barrel 105 is in a photography-ready position, in steps S1500, S1540, and S1600 of FIG. 23 it is determined whether lens barrel 105 is in a telescoping position. Further, in contrast to step S1380 of FIG. 22, in which reverse rotation of drive motor 115 occurs, in step S1510 of FIG. 23, rotation is normal.

Drive action confirming steps S1520–S1550 of FIG. 23 are the same as steps S1390–S1420 of FIG. 22, and steps S1580–S1620, which deal with the condition in which zoom-in is not performed normally, are the same as steps S1450–S1490 of FIG. 22.

According to the embodiments of the invention, as described above, operability is improved so that even if the photographer accidentally touches the lens barrel land if the lens barrel does not move within a prescribed time interval, the drive motor will resume normal drive action if the photographer stops touching the lens barrel. Also, during intermittent driving of the drive motor, if the drive switch is used to prevent varying the magnification, the intermittent driving action is stopped and any unnecessary load on the drive motor is alleviated. Thus, overheating of the drive motor may be prevented.

While the invention has been described with reference to specific embodiments, the description is illustrative and is not to be construed as limiting the scope of the invention. For example, and without limitation, it will be appreciated that the processes of FIGS. 2–9, 11 and 14–23 each can be used with each of the cameras illustrated in FIGS. 1, 10 and 12. Additionally, as described above, each of the embodiments of the invention are applicable equally to focussing, zooming, and other operations requiring lens movement. Various other modifications and changes may occur to those skilled in the art without departing from the spirit and scope of the invention.

What is claimed is:

1. A camera having a body, the camera comprising:

a lens;

a driver coupled with the lens and operable to move the lens relative to the body;

a controller coupled with the driver to direct driving of the lens relative to the body at a first desired speed and at a second desired speed slower than the first desired speed; and a detector coupled with the lens to detect 1) whether the lens is moving while the controller is directing driver movement relative to the body at the first desired speed and 2) whether the lens is moving while the controller is directing driver movement relative to the body at the second desired speed;

wherein, while the controller is directing driver movement relative to the body at the first desired speed, the controller changes the desired speed of the driver from the first desired speed to the second desired speed when the detector detects no lens movement.

2. A camera according to claim 1, wherein the controller directs driver movement at the second speed by alternately starting and stopping driver movement rapidly in succession.

3. A camera according to claim 1, further comprising a switch coupled with the controller to initiate an operational process of the camera, the controller being arranged to direct lens movement in a reverse direction when the switch is operated while the controller is directing lens movement at the second desired speed.

4. A camera according to claim 1, further comprising:
a power source having a voltage, the power source being coupled with at least the controller and adapted to power the camera; and
a further detector coupled with the controller to detect the voltage of the power source, the controller being arranged to direct termination of driver movement while the controller is directing driver movement at the second desired speed when the further detector detects that the voltage of the power source is below a predetermined level.

5. A camera according to claim 1, further comprising a switch coupled with the controller to initiate an operational process of the camera, the controller being arranged to direct termination of driver movement when the switch is operated while the controller is directing driver movement at the second desired speed.

6. A camera according to claim 5, wherein the switch comprises a half-depression switch or a full-depression switch.

7. A camera having a body; the camera comprising:
a lens;
drive means for moving the lens relative to the body;
detecting means for detecting lens movement; and
control means for 1) controlling the drive means to direct lens movement relative to the body at a first desired speed and at a second desired speed slower than the first desired speed, 2) while the control means is directing the drive means relative to the body at the first desired speed, switching the desired speed of the drive means from the first desired speed to the second desired speed when the detecting means detects no lens movement, and 3) while the control means is directing drive means movement relative to the body at the second desired speed, switching the desired speed of the drive means from the second desired speed to the first desired speed when the detecting means detects lens movement.

8. A camera according to claim 7, wherein the control means controls the drive means to direct lens movement at the second speed by rapidly intermittently moving the drive means relative to the body.

9. A camera according to claim 8, wherein:
the drive means is arranged to drive the lens at the second speed by alternating periods of lens movement with periods of lens non-movement to rapidly intermittently move the lens;
the detecting means is arranged to detect lens movement during said periods of lens movement and during said periods of lens non-movement; and
the control means is arranged to switch the desired speed of the lens from the second desired speed to the first desired speed when the detecting means detects lens movement either during a period of lens movement or during a period of lens non-movement.

10. A camera, comprising:
a lens;
a lens drive coupled with the lens to drive the lens along an optical axis of the camera between a starting position on the optical axis and a set position on the optical axis;
a lens position detector associated with the lens to detect positioning of the lens along the optical axis and to detect whether the lens has reached the set position;
a timer associated with the lens position detector to determine the time elapsed since a start of lens movement away from the starting position toward the set position; and
a lens drive regulator coupled with the lens drive to regulate the lens drive according to output of the lens position detector, the lens drive regulator being arranged to slow the speed of lens movement through the lens drive without stopping lens movement when the lens does not reach the set position within a predetermined time measured by the timer after the start of lens movement away from the starting position toward the set position.

11. A camera according to claim 10, wherein:
the lens drive includes a lens barrel arranged to support the lens for movement along the optic axis between the starting position and the set position; and
the lens position detector includes:
a conductor plate secured to the lens barrel; and
a plurality of brushes in movable contact with the conductor plate.

12. A camera according to claim 10, wherein the lens position detector includes a sensor coupled with the lens drive to determine the amount of lens movement along the optic axis.

13. A camera according to claim 10, further comprising a second timer associated with the lens position detector to determine a time elapsed since the start of lens movement away from the set position toward the starting position;
wherein the lens drive regulator is arranged to slow the speed of lens movement through the lens drive without stopping lens movement if the lens does not reach the starting position within a predetermined time measured by the second timer after the start of lens movement away from the set position toward the starting position.

14. A camera according to claim 10, wherein:
the lens position detector is arranged to indicate lens movement from the starting position; and
the lens drive regulator is arranged to slow the speed of the lens without stopping the lens if the lens does not reach the set position within a predetermined time measured by the timer after the lens position detector indicates lens movement from the starting position.

15. A camera according to claim 11, wherein the lens position detector comprises a starting switch associated with the lens to indicate lens movement from the starting position.

16. A camera according to claim 10, wherein the lens drive regulator slows the speed of the lens by repeatedly switching the lens drive on and off.

17. A camera according to claim 16, wherein the lens drive regulator slows the speed of the lens by repeatedly switching the lens drive on for 50 ms and off for 200 ms.

18. A camera having zoom capability to vary the magnification of an image being photographed, the camera comprising:

a lens barrel supporting a variable magnification optical system, the lens barrel being movable between an extended position and a retracted position to vary magnification of the image;

a lens barrel drive coupled with the lens barrel to move the lens barrel between the extended position and the retracted position;

a switching arrangement coupled with the lens barrel drive and operable to selectively 1) move the lens barrel toward the extended position, 2) move the lens barrel toward the retracted position, or 3) stop lens barrel movement;

a detector associated with the lens barrel to indicate lens barrel movement; and a lens barrel drive regulator coupled with the lens barrel drive and arranged to 1) slow lens barrel movement, without stopping lens barrel movement, when the detector fails to indicate sufficient lens barrel movement within a time interval, and to 2) stop the slowed lens barrel movement when the switching arrangement is operated to stop lens barrel movement.

19. A camera according to claim 18, wherein the lens barrel drive is arranged to produce said slowed movement by driving the lens barrel intermittently.

20. A camera according to claim 18, wherein the switching arrangement comprises a three-way switch.

21. A camera according to claim 18, wherein said time interval begins when the switching arrangement is operated to move the lens barrel toward the extended position or when the switching arrangement is operated to move the lens barrel toward the retracted position.

22. A camera according to claim 18, wherein said time interval begins when lens barrel movement is stopped forcefully between the extended position and the retracted position while the lens barrel is moving.

23. A camera having a body, the camera comprising:

a lens;

an actuator coupled with the lens to move the lens with respect to the body toward a prescribed position;

a lens position detecting device associated with the lens to detect positioning of the lens; and a controller coupled with the actuator to supply energy to the actuator thereby tending to cause lens movement toward the prescribed position at a first speed, the controller being arranged to diminish the energy supplied to the actuator, thereby tending to cause the lens to move toward the prescribed position at a second speed slower than the first speed, when the lens position detecting device determines that the lens has not moved to the prescribed position within a predetermined time interval.

24. A camera according to claim 23, wherein said time interval begins when the actuator starts to move the lens toward the prescribed position.

25. A camera according to claim 23, wherein the lens moves along an optic axis of the camera.

26. A camera according to claim 23, wherein the lens comprises a focussing lens and the actuator performs a focussing action when the actuator moves the lens.

27. A camera according to claim 23, further comprising a shutter release switch arranged so that said predetermined time interval begins in response to a signal from the shutter release switch.

28. A camera according to claim 23, wherein said predetermined time interval begins when the lens passes a predetermined location.

29. A camera according to claim 23, wherein:

the camera is arranged to expose photographic film to record an image on the film; and said predetermined time interval begins in response to exposure of the photographic film.

30. A camera according to claim 23, wherein said controller diminishes the energy supplied to the actuator by intermittently supplying energy to the actuator.

31. A camera having a body, the camera comprising:

at least one lens;

an actuator coupled with the at least one lens to move the at least one lens with respect to the body toward a prescribed position;

a lens movement detecting device associated with the at least one lens to detect movement of the at least one lens; and a controller coupled with the actuator to supply energy to the actuator thereby tending to cause movement of the at least one lens toward the prescribed position, the controller being arranged to diminish the energy supplied to the actuator when the lens movement detecting device determines that the at least one lens is not moving, wherein the actuator is arranged to attempt to continue moving the at least one lens when the controller diminishes the energy supplied to the actuator.

32. A camera according to claim 31, wherein the controller diminishes the energy supplied to the actuator by intermittently supplying the actuator with energy.

33. A camera according to claim 31, wherein the lens movement detecting device detects movement of the at least one lens by a set amount within a set time interval.

34. A camera according to claim 31, wherein the controller is arranged to increase the energy supplied to the actuator in response to movement of the at least one lens after the controller has diminished the energy supplied to the actuator.

35. A camera according to claim 31, further comprising at least one operating switch, the controller being arranged to terminate energy supply to the actuator when the operating switch is operated and the lens movement detecting device determines that the at least one lens is not moving.

36. A camera according to claim 31, further comprising at least one operating switch coupled with the controller, the controller being arranged to cause the actuator to reverse a direction of movement of the at least one lens when the operating switch is operated and the lens movement detecting device determines that the at least one lens is not moving.

37. A camera according to claim 31, further comprising a power supply and a power supply detector both coupled with the controller, the controller being arranged to terminate the supply of energy to the actuator when the power supply detector determines that the output of the power supply is below a predetermined level.

38. A camera according to claim 31, wherein the at least one lens comprises a variable-focus double lens.

39. A camera according to claim 31, wherein the camera is arranged to expose photographic film to record an image on the film, the camera further comprising a switching arrangement coupled with the controller and operable to direct the actuator to move the at least one lens to a housed position, at which exposure of the film does not occur, and to an extended position, at which exposure of the film can occur, the controller being arranged to terminate the supply of energy to the actuator when 1) the lens movement detecting device determines that the at least one lens is not moving, 2) the controller has diminished the supply of energy to the actuator, and 3) the switching arrangement is operated.

40. A camera according to claim 31, wherein the at least one lens comprises a variable-magnification zoom lens.

41. A camera according to claim 40, further comprising a plurality of externally operable switches coupled with the controller to direct the zoom lens to move alternately in a first direction and in a second direction opposite to the first direction.

42. A camera according to claim 41, wherein the lens movement detecting device is arranged to detect movement of the at least one lens only while at least one of the switches is in an on state.

43. A camera according to claim 42, wherein the controller is arranged to 1) diminish the energy supply to the actuator when the lens movement detecting device determines the at least one lens not to be moving and to 2) terminate the energy supply to the actuator when the plurality of switches are in an off state.

44. A method of moving a lens with respect to a camera body supporting the lens, the method comprising:

directing lens movement relative to the body at a first speed;

detecting whether the lens moves in response to the step of directing lens movement at the first speed; and directing lens movement relative to the body at a second speed slower than the first speed when the lens does not move in response to the step of directing lens movement at the first speed.

45. A method according to claim 44, wherein the step of directing lens movement at the second speed includes alternately starting and stopping lens movement rapidly in succession.

46. A method according to claim 44, further comprising the step of directing termination of lens movement when a switch of the camera is operated during the step of directing lens movement at the second speed.

47. A method according to claim 44, further comprising the step of directing lens movement in a reverse direction when a switch of the camera is operated during the step of directing lens movement at the second speed.

48. A method according to claim 44, further comprising:

detecting the output level of a power source of the camera; and directing termination of lens movement when the output level of the power source drops below a predetermined level during the step of directing lens movement at the second speed.

49. A method according to claim 44, further comprising, after the step of directing lens movement at the second speed, the step of directing lens movement at the first speed if the lens moves during the step of directing lens movement at the second speed.

50. A method according to claim 44, further comprising the step of detecting whether the lens moves in response to the step of directing lens movement at the second speed.

51. A method of moving a lens with respect to a camera body supporting the lens, the method comprising:

directing lens movement relative to the body along an optic axis of the camera from a starting position toward a set position;

detecting positioning of the lens along the optic axis;

determining a time elapsed since the start of lens movement toward the set position; and slowing the speed of lens movement without stopping lens movement if the lens does not reach the set position within a predetermined elapsed time after the start of lens movement toward the set position.

52. A method according to claim 51, further comprising:

directing lens movement from the set position toward the starting position;

detecting positioning of the lens along the optic axis;

determining the time elapsed since the start of lens movement toward the starting position; and slowing the speed of lens movement without stopping lens movement when the lens does not reach the starting position within a predetermined elapsed time after the start of lens movement toward the starting position.

* * * * *